US012797791B2

(12) United States Patent
Kuznicki et al.

(10) Patent No.: US 12,797,791 B2
(45) Date of Patent: *Nov. 17, 2026

(54) CARBON DIOXIDE CAPTURE USING HIGH SILICON LOW ALUMINUM $CO_2$-SELECTIVE ADSORBENT

(71) Applicant: Echeneidae Inc., Wixom, MI (US)

(72) Inventors: Steven M. Kuznicki, Flagler Beach, FL (US); Augustin Venero, Wixom, MI (US); Kasturi Nagesh Pai, Wixom, MI (US); Philip Wratchford, Wixom, MI (US); John Ustick, Wixom, MI (US)

(73) Assignee: ECHENEIDAE INC., Wixom, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/562,286

(22) Filed: Mar. 10, 2026

(65) Prior Publication Data

US 2026/0199819 A1 Jul. 16, 2026

Related U.S. Application Data

(63) Continuation of application No. 19/448,086, filed on Jan. 13, 2026.

(Continued)

(51) Int. Cl.

*B01D 53/62* (2006.01)
*B01D 53/04* (2006.01)

(Continued)

(52) U.S. Cl.

CPC ......... *B01D 53/62* (2013.01); *B01D 53/0423* (2013.01); *B01D 53/047* (2013.01);

(Continued)

(58) Field of Classification Search

None

See application file for complete search history.

(56) References Cited

U.S. PATENT DOCUMENTS 5,842,345 A * 12/1998 Scharpf ..................... C01B 3/48 423/237
6,503,297 B1 1/2003 Lu et al.

(Continued)

FOREIGN PATENT DOCUMENTS

CN 115445582 A * 12/2022 ............ B01D 53/02
WO 2009126607 A2 10/2009

(Continued)

OTHER PUBLICATIONS

CN115445582A_ENG (Espacenet machine translation of Chen) (Year: 2022).*

(Continued)

*Primary Examiner* — Gabriel E Gitman

(74) *Attorney, Agent, or Firm* — Fredrikson & Byron, P.A.

(57) ABSTRACT

A method and system can be provided for capturing carbon dioxide ($CO_2$) from gas streams containing $CO_2$ and water using high-silicon, low-aluminum pentasil zeolite adsorbents. In some examples, the adsorbents, for example, are characterized by a silicon-to-aluminum molar ratio greater than 500:1 or are substantially aluminum-free, exhibiting high $CO_2$ selectivity and hydrophobicity to minimize water competition. The adsorption may occur under controlled pressure and temperature, followed by desorption to release $CO_2$ and regenerate the adsorbent, which then supports repeated adsorption-desorption cycles with stable $CO_2$ capacity, thereby enabling efficient carbon capture from combustion exhaust or biogas for storage, utilization, or further processing.

25 Claims, 8 Drawing Sheets

Related U.S. Application Data

(60) Provisional application No. 63/744,817, filed on Jan. 13, 2025.

(51) Int. Cl.
*B01D 53/047* (2006.01)
*B01D 53/26* (2006.01)
*C01B 39/38* (2006.01)

(52) U.S. Cl.
CPC ...... *B01D 53/0462* (2013.01); *B01D 53/0476* (2013.01); *B01D 53/261* (2013.01); *B01D 2253/106* (2013.01); *B01D 2253/108* (2013.01); *B01D 2253/1085* (2013.01); *B01D 2257/504* (2013.01); *B01D 2258/01* (2013.01); *B01D 2259/4566* (2013.01); *C01B 39/38* (2013.01); *F23J 2215/50* (2013.01); *F23J 2219/60* (2013.01); *Y02C 20/40* (2020.08)

(56) References Cited

U.S. PATENT DOCUMENTS

| | | | | |
|---|---|---|---|---|
| 10,174,943 | B2 * | 1/2019 | Boulet | B01D 53/0462 |
| 11,873,748 | B2 | 1/2024 | Harding et al. | |
| 12,296,668 | B2 | 5/2025 | Griggs et al. | |
| 2008/0031801 | A1 * | 2/2008 | Lackner | C01F 11/18<br>62/602 |
| 2018/0297912 | A1 * | 10/2018 | Mitkidis | B01D 53/047 |
| 2019/0091624 | A1 * | 3/2019 | Mansour | B01D 53/0423 |
| 2022/0001364 | A1 * | 1/2022 | Cheng | C01B 39/48 |
| 2022/0280911 | A1 | 9/2022 | Wang et al. | |
| 2022/0282651 | A1 | 9/2022 | Reynolds et al. | |
| 2023/0116784 | A1 * | 4/2023 | Harding | B01D 53/0423<br>422/177 |
| 2024/0175382 | A1 * | 5/2024 | Laigle | F01N 13/0093 |
| 2024/0326684 | A1 | 10/2024 | Harding et al. | |
| 2025/0129890 | A1 | 4/2025 | Stuart et al. | |
| 2025/0135436 | A1 * | 5/2025 | Vargas | B01J 20/3219 |
| 2025/0186931 | A1 * | 6/2025 | Ando | B01D 53/0415 |

FOREIGN PATENT DOCUMENTS

| | | | | |
|---|---|---|---|---|
| WO | 2010113169 | A1 | 10/2010 | |
| WO | WO-2019180241 | A1 * | 9/2019 | B01D 53/04 |
| WO | 2023190609 | A1 | 10/2023 | |
| WO | WO-2025136353 | A1 * | 6/2025 | B01D 53/82 |

OTHER PUBLICATIONS

Bernal et al. (2004. Separation of CO2/N2 mixtures using MFI-type zeolite membranes. AIChE journal, 50(1), 127-135.) (Year: 2004 ).*
Jedli et al. (2022. Adsorption of CO2 onto zeolite ZSM-5: Kinetic, equilibrium and thermodynamic studies. Fuel, 321, 124097.) (Year: 2022).*
Boer et al., “Zeolites as Selective Adsorbents for CO2 Separation”, ACS Appl. Energy Mater., 6, 2023, pp. 2634-2656.
Boer et al., “ZSM-5/Silicalite-1 core-shell beads as CO2 adsorbents with increased hydrophobicity”, Materials Today Chemistry, 32, 2023, p. 10.
Datta et al., “CO2 capture from humid flue gases and humid atmosphere using a microporous coppersilicate”, Science, vol. 350, Iss. 6258, Oct. 16, 2015, pp. 302-306.
Desbiens et al., “Water Condensation in Hydrophobic Silicalite-1 Zeolite: A Molecular Simulation Study”, J. Phys. Chem. B, 109, Oct. 7, 2005, pp. 24071-24076.
Galhotra et al., “Carbon dioxide (C16O2 and C18O2) adsorption in zeolite Y materials: effect of cation, adsorbed water and particle size”, Energy & Enviromental Science, 2(4), Mar. 2009, pp. 401-409.
Hedin et al., “Sorbents for CO2 capture from flue gas-aspects from materials and theoretical chemistry”, The Royal Society of Chemistry, Nanoscale, 2, Mar. 31, 2010, pp. 1819-1837.
International Searching Authority, “International Search Report and Written Opinion”, From Application No. PCT/US2026/011165, Mailed Mar. 6, 2026, p. 16.
Liu et al., “Synthesis of fly ash-based microporous copper silicate for CO2 capture from humid flue gases”, Korean J. Chem. Eng., 36(3), Dec. 27, 2018, pp. 450-455.
Rees et al., “Sorption of N2, CH4 and CO2 in Silicalite-1”, Gas separation & purification, vol. 5, Iss. 2, Jun. 1991, pp. 67-75.
Wang et al., “CO2 and water vapor adsorption properties of framework hybrid W-ZSM-5/silicalite-1 prepared from RHA”, Royal Society of Chemistry Advances, 10, 2020, pp. 24642-24652.
Yan et al,, “CO2 capture by ZSM-5 with varied Si/Al molar ratios: Isothermal adsorption capacity of CO2 vs dynamic CO2 adsorption capacity”, Separation and Purification Technology, 354, Aug. 22, 2024, p. 7.

* cited by examiner

CARBON DIOXIDE CAPTURE USING HIGH SILICON LOW ALUMINUM $CO_2$-SELECTIVE ADSORBENT

TECHNICAL FIELD

This application is a continuation of U.S. patent application Ser. No. 19/448,086, filed Jan. 13, 2026, which claims the benefit of and priority to U.S. Provisional Patent Application No. 63/744,817, filed Jan. 13, 2025. The entire contents of both of these applications are incorporated herein by reference.

TECHNICAL FIELD

This disclosure relates to carbon capture and, more particularly, to adsorbents used to capture carbon dioxide from wet gas streams.

BACKGROUND

The need for carbon dioxide ($CO_2$) capture and sequestration is pressing due to the growing concerns over climate change. Among various methods available for $CO_2$ capture, Pressure Vacuum Swing Adsorption (PVSA) is an option for applications due to its high efficiency and flexibility. PVSA technology is widely used in gas separation processes, and when combined with solid adsorbents, it offers an efficient, compact, and scalable approach to capture $CO_2$ from various emission sources. The $CO_2$ capture efficiency and the commercial viability of adsorption systems depends on the performance of the adsorbent used in the system.

SUMMARY

This disclosure relates to systems and techniques for capturing and recovering carbon dioxide from gas streams such as those generated by combustion of carbon-containing fuel sources and, more particularly, to adsorbents for use in such systems and techniques. In various examples, the described systems and techniques can be implemented to capture and recover carbon dioxide from a stationary or mobile source that generates a gas containing carbon dioxide, water, and other constituent species. The generated gas stream can be directed to an adsorption bed and the carbon dioxide captured from the gas stream via adsorption by an adsorbent in the adsorption bed. Adsorption and desorption from the adsorption bed can be controlled through pressure control. For example, adsorption can occur at comparatively high pressure in which gas molecules are adsorbed onto a solid adsorbent. Desorption can occur by reducing the pressure, allowing the adsorbed gases to be released, and regenerating the adsorbent for further use. Additionally, or alternatively, adsorption can be controlled by a temperature swing and/or a concentration swing, such as increasing adsorbent temperature or decreasing surrounding $CO_2$ partial pressure to promote desorption, and lowering temperature or increasing $CO_2$ partial pressure to enhance adsorption.

Adsorbent selection is important for controlling the efficiency and capacity of $CO_2$ removal. An adsorbent desirably exhibits high selectivity to preferentially adsorb $CO_2$ over other gases present in the gas stream being processed, such as water, nitrogen, oxygen, etc. In accordance with the present disclosure, the inventors have identified particular adsorbents believed to be especially efficacious at adsorbing carbon dioxide from wet gas streams where the water present in the gas stream being processed otherwise competes with binding sites for carbon dioxide. The identified adsorbents can maintain a steady-state carbon dioxide adsorption capacity that does not substantially diminish over repeated adsorption-desorption cycling, even across hundreds of thousands to millions of cycles. This long-cycle stability contrasts with alternative materials that progressively accumulate water or other co-adsorbed species that do not fully desorb during regeneration, which gradually occludes adsorption sites and degrades carbon dioxide adsorption capacity over time. By minimizing competitive water uptake and inhibiting irreversible loading, the disclosed adsorbents preserve carbon dioxide capacity throughout extended operation in humid exhaust gas stream environments.

Without wishing to be bound by any particular theory of operation, it is believed that the cationic sites in zeolites interact strongly with polarizable molecules such as $CO_2$, and even more strongly with polar molecules such as water. This leads to both water and $CO_2$ being stripped from gas streams but with preferential water adsorption which can, in fact, block or displace CO2 adsorption. However, if a significant number or substantially all of the charged/active sites are removed from an inorganic molecular sieve, it may still retain its high surface area, high void space structure albeit in a more neutral adsorptive state. Such comparatively neutral low site density zeolites may lose their attraction to water. Accordingly, such adsorbent materials can be hydrophobic and may adsorb and be used for taking molecules (such as $CO_2$) away from wet gas streams while minimizing the competitive adsorption by water.

In accordance with the present disclosure, the inventors have identified zeolite adsorbents characterized by having very high amounts of silicon and very low amounts of aluminum as being particularly effective for adsorbing carbon dioxide from a water-containing gas stream, including those generated by a carbon fuel combustion source that contains other combustion byproducts. Specific adsorbents that can be used include high silicon, low aluminum pentasil zeolites, such as those having a silicon-to-aluminum molar ratio greater than 500:1, or being substantially aluminum-free. Pentasil zeolites can exhibit a neutral, hydrophobic framework that reduces competitive uptake of water while maintaining high surface area and accessible microporosity for carbon dioxide adsorption. The low aluminum content minimizes the density of charged sites that otherwise attract polar water molecules, thereby preserving carbon dioxide selectivity in wet gas streams and enabling stable, repeatable performance in cyclic operation. The adsorbents can exhibit a steady state carbon dioxide adsorption capacity that does not substantially change across numerous adsorption and desorption cycles, providing an efficient adsorbent for long lifecycle use.

In one example, a method for separating carbon dioxide from a gas stream containing carbon dioxide and water is provided. The method includes performing a plurality of adsorption and desorption cycles. Each adsorption cycle includes contacting an adsorbent with the gas stream, where the adsorbent has a low aluminum content defined by a silicon-to-aluminum molar ratio greater than 500:1 or is substantially aluminum-free, under conditions effective to cause the adsorbent to adsorb carbon dioxide and water from the gas stream, resulting in an adsorbed amount of carbon dioxide and an adsorbed amount of water on the adsorbent. Each desorption cycle includes releasing substantially all of the adsorbed amount of carbon dioxide and substantially all of the adsorbed amount of water from the adsorbent.

According to the example, the adsorbent exhibits a carbon dioxide adsorption capacity that does not substantially decrease between each of the plurality of adsorption and desorption cycles.

In another example, a method for separating carbon dioxide from a gas stream containing carbon dioxide and water is described. The method includes contacting an adsorbent with the gas stream, where the adsorbent has a low aluminum content defined by a silicon-to-aluminum molar ratio greater than 500:1 or is substantially aluminum-free, under conditions effective to cause the adsorbent to adsorb carbon dioxide from the gas stream, and subsequently performing a desorption step to release the adsorbed carbon dioxide and regenerate the adsorbent.

In another example, a method for separating carbon dioxide from a gas stream containing carbon dioxide and water is described. The method includes performing a plurality of adsorption and desorption cycles. Each adsorption cycle includes contacting an adsorbent with the gas stream, where the adsorbent is a low aluminum pentasil zeolite having a silicon-to-aluminum molar ratio greater than 500:1 or is substantially aluminum-free, under conditions effective to cause the adsorbent to adsorb carbon dioxide and water from the gas stream, resulting in an adsorbed amount of carbon dioxide and an adsorbed amount of water on the adsorbent. Each desorption cycle includes releasing substantially all of the adsorbed amount of carbon dioxide and substantially all of the adsorbed amount of water from the adsorbent. According to the example, the adsorbent exhibits a carbon dioxide adsorption capacity that does not substantially decrease between each of the plurality of adsorption and desorption cycles.

The details of one or more examples are set forth in the accompanying drawings and the description below. Other features, objects, and advantages will be apparent from the description and drawings, and from the claims.

DETAILED DESCRIPTION

Figure 1:
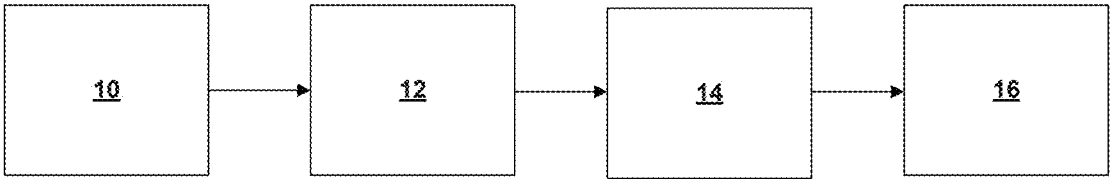
FIG. 1 is a block diagram illustrating an example carbon dioxide gas generation and recovery system that can use features of the present disclosure.

In general, this disclosure generally relates to methods and systems for separating carbon dioxide from a gas stream containing carbon dioxide and water by performing multiple adsorption and desorption cycles. In some examples, a low-aluminum pentasil zeolite adsorbent, characterized by a silicon-to-aluminum molar ratio greater than 500:1 or being largely aluminum-free, may be contacted with the gas stream under conditions that can enable the adsorption of both carbon dioxide and water. A subsequent desorption step can be performed that results in release of substantially all or all of the adsorbed amount of carbon dioxide and substantially all or all of the adsorbed amount of water from the adsorbent. As a result, adsorbent can retain its steady state carbon dioxide adsorption capacity without significant reduction between successive cycles.

For example, a method may include contacting the low-aluminum pentasil zeolite adsorbent with the gas stream to adsorb carbon dioxide and then performing a desorption step to release the adsorbed carbon dioxide and regenerate the adsorbent. In some such examples, the adsorbent can be contacted with the gas stream at a pressure ranging from 1 bar to 30 bar and at a temperature below 100° C., such as ambient temperature. Thereafter, desorption may be effected by reducing pressure to below 1 bar, raising temperature, and/or introducing a purge gas to displace the adsorbed species.

In accordance with the present disclosure, the inventors have identified zeolite adsorbents characterized by having very high amounts of silicon and very low amounts of aluminum as being particularly effective for adsorbing carbon dioxide from a water-containing gas stream, including those generated by a carbon fuel combustion source that contains other combustion byproducts. Specific adsorbents that may be used include high silicon, low aluminum pentasil zeolites, such as those having a silicon-to-aluminum molar ratio greater than 500:1, or being substantially aluminum-free. Pentasil zeolites can exhibit a neutral, hydrophobic framework that reduces competitive uptake of water while maintaining high surface area and accessible microporosity for carbon dioxide adsorption. The low aluminum content minimizes the density of charged sites that otherwise attract polar water molecules, thereby preserving carbon dioxide selectivity in wet gas streams and enabling stable, repeatable performance in cyclic operation.

Pentasil zeolites are crystalline aluminosilicates generally characterized by the MFI family of frameworks (e.g., comprising a three-dimensional system of intersecting, medium-sized channels formed by 10-membered rings of tetrahedrally coordinated T atoms (T=Si, Al)). The topology can feature channels that intersect at junctions that create efficient diffusion pathways and accessible adsorption sites, yielding high micropore volume and surface area suitable for physisorption of carbon dioxide. In low-aluminum or substantially aluminum-free variants, the framework is dominated by Si—O—Si linkages, which lowers the density of framework negative charges and associated extra-framework cations, thereby reducing strong electrostatic attractions to polar water and other polar molecules and enhancing hydrophobicity.

Specific examples of zeolite adsorbents used in systems and techniques according to the disclosure including silicalite and high silicon, low aluminum ZSM-5. Silicalite, a substantially aluminum-free MFI-type zeolite, can be synthesized using organic structure-directing agents and subsequently calcined, for example at 500° C. to 600° C., to remove the template and stabilize the framework. Because silicalite lacks cation exchange sites and contains predominantly Si—O—Si linkages, it exhibits high hydrophobicity and excellent thermal stability, which supports preferential adsorption of carbon dioxide over water in humid exhaust.

ZSM-5 is an adsorbent that comprises a crystalline aluminosilicate zeolite of the MFI framework type, typically represented by the general chemical formula $M_{n/z}[Al_nSi_{96-n}O_{192}]\cdot 16H_2O$, where M is a cation of valence z. The structure can be characterized by a high-silica three-dimensional network of $SiO_4$ and $AlO_4$ tetrahedra linked through shared oxygen atoms. These primary structural units form pentasil units (eight five-membered rings) that link into chains to define a pore architecture. ZSM-5 can be processed to increase its silicon-to-aluminum molar ratio, for example by dealumination via steaming and calcination, to achieve ratios greater than 500:1 and impart similar hydrophobic behavior while retaining the pentasil channel system that facilitates rapid mass transfer. In some examples, the adsorbent may be formed with a low-sodium silica binder and activated, for example near 375° C., to improve kinetics and reduce binder-derived ionic sites that could otherwise increase water affinity.

The Pentasil zeolite adsorbents used in example system and techniques according to the disclosure can be characterized by having a high silicon and low aluminum content (e.g., a high silica to low alumina ratio ($SiO_2/Al_2O_3$)). In various examples, the adsorbent is characterized by having a silicon-to-aluminum ratio greater than 300:1, such as greater than 400:1, greater than 500:1, greater than 600:1, greater than 700:1, greater than 800:1, greater than 900:1, greater than 1000:1, or greater than 1100:1, or greater than 1200:1. Silicalite is substantially aluminum-free, though trace impurity aluminum may be present from synthesis or feedstock, resulting in a very low but nonzero aluminum content. As used herein, "substantially aluminum-free" means that aluminum is absent from the framework or present only as trace impurities corresponding to a silicon-to-aluminum molar ratio of at least 1300:1 as measured by inductively-coupled plasma optical emission spectroscopy (ICP-OES).

An adsorbent according to the disclosure can be used to adsorb carbon dioxide from a gas stream having a comparatively high carbon dioxide, such as greater than 1 mol % carbon dioxide. The adsorbent can be used through repeated adsorption/desorption cycles that can exceed 100,000 cycles, 1,000,000 cycles, or even 5,000,000 cycles without significant loss of capacity.

FIG. 1 is a block diagram illustrating an example carbon dioxide gas generation and recovery system that can use features of the present disclosure. In the illustrated example, a gas stream source 10 generates carbon dioxide that can be processed using systems and techniques according to the disclosure. In some examples, gas stream source 10 can include a combustion source that generates carbon dioxide-containing exhaust suitable for treatment. Example combustion sources comprise internal combustion engines operating on carbon-containing fuels such as gasoline, diesel, natural gas, biogas, jet fuel, or bunker sea crude. Such engines may be deployed on on-road vehicles (e.g., passenger cars, trucks, buses), off-road equipment (e.g., construction machinery), trains, ships, or airplanes, or within stationary installations such as generators, boilers, or industrial furnaces. Exhaust from these sources typically contains carbon dioxide, water vapor, nitrogen, and optionally oxygen, carbon monoxide, hydrocarbons, nitrogen oxides, sulfur oxides, particulates, and other trace species. In some applications as will be described, the gas stream is an exhaust gas from combustion of a carbon-containing fuel source, and the identified adsorbents herein can be integrated downstream (optionally after an aftertreatment system) to selectively capture carbon dioxide while tolerating the presence of water and combustion byproducts.

Additionally or alternatively, gas stream source 10 can be or include biogenic sources such as anaerobic digesters, wastewater treatment facilities, agricultural or food waste digesters, and landfill gas collection systems that produce biogas. Biogas may contain a significant fraction of carbon dioxide and methane, alongside water vapor and trace contaminants (e.g., hydrogen sulfide, siloxanes, volatile organic compounds). The biogas may or may not be conditioned prior to adsorption to reduce foulants. In either case, the disclosed adsorbents can be employed to selectively remove carbon dioxide from humid biogas streams. Independent of type of gas stream source 10, an adsorption system can be configured to operate continuously or semi-continuously with cyclic adsorption and desorption steps, yielding a concentrated carbon dioxide stream for storage, utilization, or further processing.

Gas stream source 10 can be a stationary source or a mobile source. A stationary source refers to an installation that remains fixed in place during operation, such as industrial boilers, furnaces, electric power generators, combined heat and power units, or process heaters located within manufacturing facilities, refineries, or chemical plants. These sources typically have consistent operating schedules, established utility connections, and available footprint for auxiliary equipment, facilitating integration of adsorption vessels, compression, and storage infrastructure. A mobile source, by contrast, refers to a platform that moves during operation, such as on-road vehicles (passenger cars, commercial trucks, buses), off-road equipment (construction machinery, agricultural machinery), trains, ships, or airplanes. Mobile sources may present dynamic operating profiles, variable duty cycles, limited footprint, and weight constraints, and may require compact, vibration-tolerant adsorption systems with onboard control and storage.

An adsorption system according to the disclosure can be configured for use with a stationary gas stream source 10 or a mobile gas stream source 10. For stationary sources, the adsorption system may include one or more fixed beds housed in a plant-level equipment arrangement (e.g., permanent installation, skid), dedicated compressors or vacuum pumps, and optionally downstream liquid $CO_2$ storage tanks connected to existing utilities. For mobile sources, the adsorption system may be packaged into a vehicle-mounted module that may include one or more compact adsorption vessels; pressure, temperature, and/or concentration swing capability; onboard controls; and storage sized for route-specific offloading intervals. In either configuration, an adsorption system can operate in cyclic adsorption and desorption steps, with the control strategy and hardware selection tailored to the source's duty cycle, available footprint, and logistics for $CO_2$ recovery, storage, and offloading.

The composition of a gas stream generated by gas stream source 10 and supplied to contact an adsorbent for separating carbon dioxide from the gas stream can vary. In general, the gas stream may include water vapor and carbon dioxide. When the gas stream is an exhaust gas from combustion of a carbon-containing fuel source, the gas stream may include water vapor, carbon dioxide, and nitrogen. Water vapor is generated as a byproduct of the combustion of hydrocarbon fuels. Carbon dioxide is also a major product of combustion, formed when carbon in the fuel reacts with oxygen. Nitrogen, which makes up about 78% of air, remains largely unchanged during combustion and is a significant portion of the exhaust gas. If excess air is used during combustion, oxygen may also be present in the exhaust. Additionally, if combustion is incomplete, carbon monoxide, hydrocarbons, and nitrogen oxides (NOx) can be formed. Carbon monoxide results from incomplete combustion due to insufficient oxygen, while hydrocarbons represent unburned fuel. Nitrogen oxides are created at high temperatures when nitrogen and oxygen from the air combine. Diesel engines, in particular, may produce particulate matter (PM), which consists of fine soot particles. The exhaust may also contain trace pollutants such as sulfur dioxide, which forms if sulfur is present in the fuel, and volatile organic compounds (VOCs)

or aldehydes, products of incomplete combustion. Overall, the composition of a wet gas stream depends on factors such as fuel type, engine design, and combustion efficiency.

In some examples, a gas stream produced by a biogas source can include carbon dioxide and methane as major constituents, alongside water vapor and trace contaminants. For instance, the biogas may comprise from 30 mol % to 60 mol % carbon dioxide, from 40 mol % to 70 mol % methane, from 0.5 mol % to 5 mol % water vapor, and one or more of hydrogen sulfide (e.g., 10 to 5000 ppmv), siloxanes (e.g., 0 to 6 ppmv), volatile organic compounds (e.g., 0 to 5000 ppmv), oxygen (e.g., 0 to 2 mol %), and nitrogen (e.g., 0 to 10 mol %). The specific composition can vary with feedstock, digestion conditions, and upstream conditioning steps. In some implementations, the biogas may be pretreated to reduce hydrogen sulfide, particulate matter, and siloxanes prior to contacting the adsorbent to mitigate fouling and preserve adsorption performance.

The gas stream produced by gas stream source 10 can optionally be processed after being generated by gas stream source 10 by prior to contacting an adsorbent for separating carbon dioxide from the gas stream. In the example of FIG. 1, the gas stream may undergo treatment in a gas aftertreatment system (ATS) 12 before being sent to an adsorption system for carbon dioxide capture and removal. Gas aftertreatment refers to a set of processes that can be used to reduce harmful emissions from the exhaust gases and may involve technologies designed to remove or neutralize pollutants like nitrogen oxides (NOx), carbon monoxide (CO), hydrocarbons (HC), and particulate matter (PM). This can prevent the contaminants from being released into the atmosphere and/or help prevent the substances from poisoning a downstream adsorbent bed.

For example, prior to contacting the adsorbent, the gas stream can undergo pretreatment to reduce contaminants that may foul the bed or compete for adsorption sites. In combustion exhaust applications, pretreatment can include particulate filtration (e.g., high-efficiency filters or cyclones) to remove soot and ash; oxidation catalysts to reduce hydrocarbons and carbon monoxide; selective catalytic reduction (SCR) and/or lean NOx traps to lower nitrogen oxides; and a desulfurization unit (e.g., oxidation followed by adsorption or scrubbing) to mitigate sulfur oxides. Moisture management may be implemented to control condensation and protect downstream components, for example by maintaining exhaust above dew point through insulation or heat tracing. Where oxygen content is high, oxidation catalysts can be deployed upstream to convert residual CO to $CO_2$ without significantly impacting overall capture performance.

For biogas or other humid mixed-gas streams, pretreatment can include bulk moisture knock-out using condensers or demisters, followed by fine drying to a target relative humidity using desiccants or membrane dryers; hydrogen sulfide removal via iron oxide/organic media adsorption, caustic scrubbing, or amine polishing; siloxane abatement using activated carbon or specialized silica gels; and particulate filtration to remove entrained solids. Volatile organic compounds can be reduced by activated carbon polishing beds, and ammonia can be scrubbed with acid solutions or captured by selective adsorbents. In some implementations, compression and chilling may be used to condense and remove heavy hydrocarbons prior to adsorption, and coalescing filters downstream of compressors protect the adsorbent from lubricant carryover. These pretreatment steps can be selected and sequenced based on the source composition, duty cycle, and the adsorbent's tolerance to specific contaminants, thereby preserving long-term adsorption performance and minimizing irreversible loading.

In some examples, the gas stream supplied to the adsorption system—whether directly from gas stream source 10 or following pretreatment—contains carbon dioxide at a range of concentrations depending on the source and operating conditions. The carbon dioxide content can be at least 0.5 mol % on a dry weight basis, such as at least 1 mol % on a dry weight basis, at least 3 mol % on a dry weight basis, at least 5 mol % on a dry weight basis, at least 8 mol % on a dry weight basis, at least 10 mol % on a dry weight basis, at least 12 mol % on a dry weight basis, at least 15 mol % on a dry weight basis, or at least 20 mol % on a dry weight basis. For example, concentration of carbon dioxide may range from 1 mol % on a dry weight basis to 50 mol % on a dry weight basis, such as from 3 mol % on a dry weight basis to 25 mol % on a dry weight basis, or from 5 mol % on a dry weight basis to 25 mol % on a dry weight basis. In various examples, the carbon dioxide fraction can fall within ranges such from 0.5 mol % on a dry weight basis to 5 mol % on a dry weight basis, from 3 mol % on a dry weight basis to 10 mol % on a dry weight basis, from 5 mol % on a dry weight basis to 16 mol % on a dry weight basis, from 10 mol % on a dry weight basis to 25 mol % on a dry weight basis, or from 25 mol % on a dry weight basis to 60 mol % on a dry weight basis on a dry basis. Higher carbon dioxide levels may be observed in biogas upgrading or flue gas streams with limited excess air, while lower levels may occur in diluted exhaust or air capture-adjacent scenarios.

As used herein, "on a dry weight basis" means that the concentration is calculated after removing water from the gas stream, i.e., with water excluded from the denominator when expressing constituent fractions. Unless expressly stated as being "on a dry weight basis," compositional values herein are to be interpreted as including the weight of water in the calculation of the relative amount of the constituent component.

In addition to carbon dioxide, the gas stream supplied to the adsorption system—again whether directly from gas stream source 10 or following pretreatment—can contain water. Water can be present in the gas stream at varying concentrations influenced by source type, temperature, and pretreatment. In some cases, water vapor content can be up to 0.5 mol %, such as from 0.1 mol % to 0.5 mol %, from 0.5 mol % to 2 mol %, or from 2 mol % to 5 mol %. In other implementations, the water fraction can be higher, for example from 5 mol % to 10 mol %, from 10 mol % to 20 mol %, or from 20 mol % to 30 mol %, reflecting humid gas conditions. Expressed as relative humidity, the stream may be controlled to 70% or less, 60% or less, 50% or less, 40% or less, 30% or less, or 20% or less, or within bands such as 60% to 100%, 40% to 80%, or 20% to 60%, depending on temperature and dew point management. Relative humidity refers to the ratio of the partial pressure of water vapor in the gas to the saturation vapor pressure at the same temperature, expressed as a percentage. The adsorption system can be configured to tolerate and manage these water levels, including operation with elevated humidity while maintaining selective carbon dioxide uptake and robust cyclic performance.

Additional or alternatively, the gas stream can include nitrogen. Nitrogen can be present as a major diluent in many gas streams, such as those derived from air-fed combustion or ambient air admixture. In some examples, nitrogen may constitute at least 40 mol % of the gas stream, such as at least 60 mol %, at least 70 mol %, or at least 80 mol %. For example, nitrogen may constitute from 40 mol % to 70 mol % of the gas stream, such as from 60 mol % to 85 mol %, or from 70 mol % to 90 mol %, depending on excess air, mixing, and pretreatment conditions. The disclosed adsorption systems and adsorbents can preferentially adsorb carbon dioxide over nitrogen such that the mole ratio of carbon dioxide adsorbed to nitrogen adsorbed is greater than 1 under typical contacting conditions, maintaining selectivity even in nitrogen-rich streams.

In addition to carbon dioxide, water vapor, and/or nitrogen, the gas stream—again whether directly from gas stream source 10 or following pretreatment—can contain oxygen, which may be present in an amount ranging from 1 mol % to 12 mol %, such as 1 mol % to 5 mol %, 3 mol % to 10 mol %, or 8 mol % to 12 mol %, depending on excess air and combustion efficiency. Additionally or alternatively, the gas stream can contain carbon monoxide, which can be present from 10 ppmv to 10,000 ppmv, for example 10 ppmv to 500 ppmv, 100 ppmv to 2,000 ppmv, or 1,000 ppmv to 10,000 ppmv. Additionally or alternatively, the gas stream can contain nitrogen oxides (NOx), which can be present from 0 ppmv to 1,000 ppmv, such as 0 ppmv to 100 ppmv, 50 ppmv to 500 ppmv, or 200 ppmv to 1,000 ppmv. Additionally or alternatively, the gas stream can contain sulfur oxides (SOx), which can be present from 0 ppmv to 100 ppmv, for example 0 ppmv to 20 ppmv, 5 ppmv to 50 ppmv, or 20 ppmv to 100 ppmv. Additionally or alternatively, the gas stream can contain hydrocarbons (as total hydrocarbons), which can be present from 0 ppmv to 5,000 ppmv, such as 0 ppmv to 500 ppmv, 100 ppmv to 2,000 ppmv, or 1,000 ppmv to 5,000 ppmv, reflecting incomplete combustion and fuel type.

Particulates can be present in the gas stream, whether directly from gas stream source 10 or following pretreatment. Particulates may be present in an amount from 0 wt % to 0.5 wt %, for example 0 wt % to 0.1 wt %, 0.05 wt % to 0.3 wt %, or 0.1 wt % to 0.5 wt %, depending on engine technology and aftertreatment effectiveness. Additionally or alternatively, the gas stream can contain non-methane hydrocarbons, which can be present from 0 ppmv to 15 ppmv, for example 0 ppmv to 5 ppmv, 2 ppmv to 10 ppmv, or 5 ppmv to 15 ppmv, and/or siloxanes, which can be present from 0 ppmv to 6 ppmv, such as 0 ppmv to 2 ppmv, 1 ppmv to 4 ppmv, or 2 ppmv to 6 ppmv. It should be appreciated that the foregoing numerical ranges are provided as illustrative examples to describe representative operating conditions and compositions, and the disclosure is not limited to these values or ranges unless otherwise specified.

With further reference to FIG. 1, the system of FIG. 1 includes an adsorption system 14 including one or more adsorption beds containing an adsorbent selected as described herein for capturing and removing carbon dioxide from the gas stream being processed. The gas adsorption system 14 may include multiple beds (e.g., two or more) containing the selected adsorbent. This can allow one or more beds to be operating in an adsorption phase while one or more other beds are operating in a desorption phase, allowing for uninterrupted feed gas flow and $CO_2$ capture.

Figure 2:
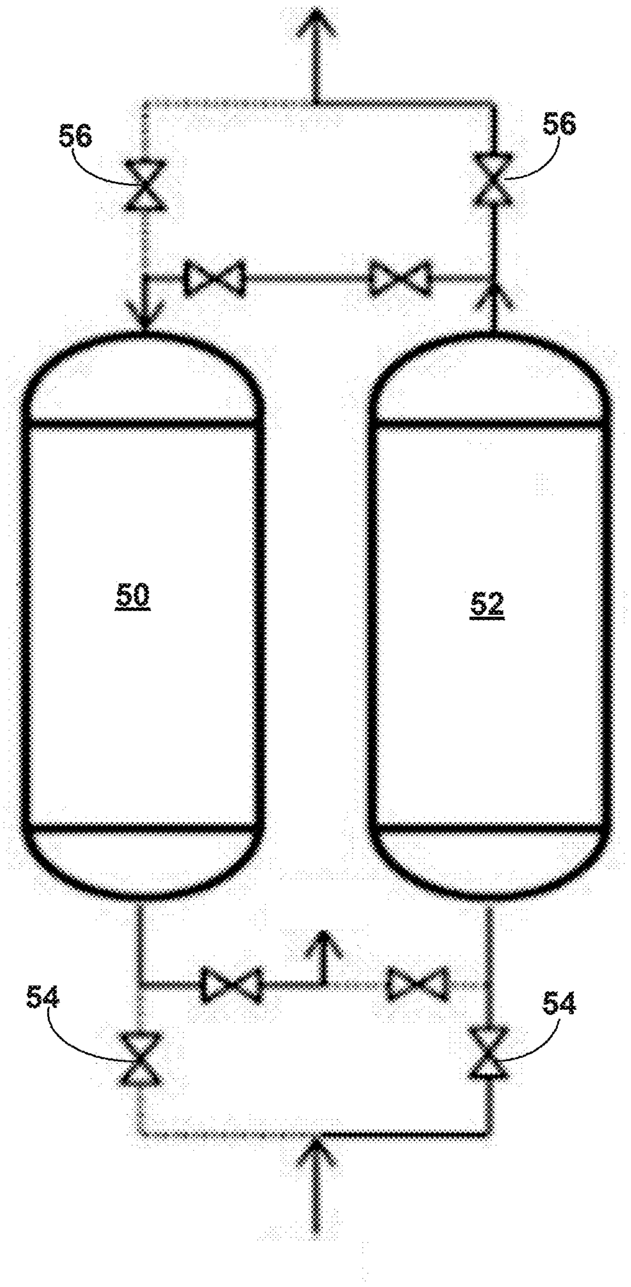
FIG. 2 is a schematic diagram illustrating an example configuration of adsorption system that can be used in the system of FIG. 1.

FIG. 2 is a schematic diagram illustrating an example configuration of adsorption system 14 that can be used in the system of FIG. 1. Adsorption system 14 in the example of FIG. 2 can be configured for cyclic adsorption and desorption of carbon dioxide from a gas stream. In the illustrated example, system 14 is illustrated as including multiple adsorption columns, including a first adsorption column 50 and a second adsorption column 52, which can operate simultaneously or in alternating phases to ensure continuous processing of the gas stream.

An input source is provided for supplying the gas stream containing carbon dioxide and other constituents to adsorption system 14. The input source can be connected via piping to a network of valves, which regulate flow into first adsorption column 50 and second adsorption column 52. Each adsorption column contains an adsorbent material, such as silicalite or other low-aluminum pentasil zeolite as described herein, that can selectively adsorb carbon dioxide from the gas stream.

Adsorption system 14 in FIG. 2 can be configured such that the contacting of the gas stream with the adsorbent occurs within an adsorption vessel, specifically first adsorption column 50 and/or second adsorption column 52. Pressure within each adsorption column can be controlled during the adsorption and desorption steps. This control may be achieved by actuating one or more inlet valves 54, outlet valves 56, back-pressure regulators, compressors, or vacuum pumps fluidly coupled to each adsorption column. For example, during the adsorption phase, the pressure within a selected adsorption column may be maintained at a setpoint suitable for carbon dioxide uptake, while during the desorption phase, the pressure may be reduced to facilitate release of the adsorbed carbon dioxide.

The system may include at least two adsorption columns operated out of phase, such that at least one adsorption column 50, 52 is in the adsorption step while at least one other adsorption column 50, 52 is in the desorption step. This arrangement can allow for uninterrupted feed gas flow and continuous carbon dioxide capture. Between the adsorption and desorption steps, the adsorption column can be isolated by closing both the inlet and outlet valves, enabling switching between pressure setpoints and preventing cross-contamination between phases.

An output destination can be provided for collecting the processed gas stream having a reduced level of carbon dioxide. A separate output destination can be provided for collecting the gas stream generated during the desorption phase, including the captured carbon dioxide released during the desorption phase.

In various examples, the system of FIG. 2 can be operated in pressure swing, temperature swing, and/or concentration swing modes to control the adsorption and desorption of carbon dioxide within first adsorption column 50 and second adsorption column 52. During a pressure swing mode, the adsorption phase can be carried out at a comparatively high pressure, which promotes the uptake of carbon dioxide onto the adsorbent material. Desorption can then be effected by reducing the pressure within the selected adsorption column, such as by actuating a vacuum pump or opening outlet valves, thereby releasing the adsorbed carbon dioxide and regenerating the adsorbent for subsequent cycles.

Alternatively, or in addition, the system may be operated in a temperature swing mode, where the temperature of the adsorbent is increased during the desorption phase to facilitate the release of adsorbed carbon dioxide. This can be achieved by integrating heating elements or by introducing a heated purge gas into the adsorption column. In a concentration swing mode, the partial pressure of carbon dioxide surrounding the adsorbent can be decreased during desorption, for example by introducing a purge gas with low carbon dioxide concentration, which drives the release of carbon dioxide from the adsorbent. These operational modes can be implemented independently or in combination, allowing for flexible and efficient control of the adsorption and desorption cycles in the system of FIG. 2.

In some implementations, each adsorption cycle within adsorption column 50 and/or adsorption column 52 of FIG.

2 can be conducted at an absolute pressure greater than 1 bar absolute, such as an absolute pressure greater than 2 bar, greater than 3 bar, greater than 4 bar, greater than 5 bar, greater than 10 bar, or greater than 20 bar. For example, each adsorption cycle may be conducted at an absolute pressure within a range from 1 bar to 30 bar, such as from 1 bar to 5 bar. The temperature of the adsorbent during each adsorption cycle may be at a temperature less than 100 degrees Celsius, such as less than 80 degrees Celsius. In some examples, the temperature of the adsorbent and/or adsorption column during each adsorption cycle may be at ambient temperature in which external heating or cooling is not applied.

During each desorption cycle, the pressure within the adsorption column can be reduced to a level less than the pressure at which each adsorption cycle was performed. In some examples, a pressure difference between each adsorption cycle and each desorption cycle is at least 1 bar, such as at least 2 bar, at least 3 bar, or at least 5 bar. In some examples, each desorption cycle is performed by reducing the pressure in the adsorption column to an absolute pressure less than 1 bar to facilitate the release of adsorbed carbon dioxide and regenerate the adsorbent. The temperature during desorption may be increased, for example by integrating heating elements or introducing a heated purge gas, to further promote the release of adsorbed carbon dioxide. Alternatively, the temperature of the adsorbent and/or adsorption column during each desorption cycle may be at ambient temperature in which external heating or cooling is not applied.

The system may be configured to control the pressure within the adsorption vessel during both the adsorption and desorption steps by actuating inlet and outlet valves, as well as utilizing back-pressure regulators, compressors, or vacuum pumps fluidly coupled to the adsorption columns. The precise control of pressure and/or temperature conditions can enable efficient cycling between adsorption and desorption, supporting reliable and repeatable carbon dioxide capture performance.

Independent of the number and configuration of adsorption columns, each adsorption column can contain a selected adsorbent or combination of adsorbents within one or more beds defined in each column. In some examples, an adsorption column may contain a single high silicon, low aluminum adsorbent as described in the disclosure, such as silicalite or highly dealuminated ZSM-5. The adsorbent may be compositionally homogeneous throughout the bed, providing consistent adsorption properties and selectivity for carbon dioxide. Alternatively, system 14 may include one or more additional adsorbents (e.g., a second, third, fourth, etc. adsorbent) that does not necessarily have a high silicon, low aluminum composition. These one or more additional adsorbents can be mixed with the first adsorbent within the same bed, placed in a different bed within the same adsorption column, or located in a separate adsorption column. Such configurations allow for tailored adsorption characteristics and enable the system to address specific separation requirements or optimize performance for varying gas stream compositions.

The adsorbent for use in the adsorption column can have a variety of different physical characteristics. The adsorbent(s) may be substantially porous. The adsorbent(s) can be formed into a plurality of aggregated beads, pellets, and/or other element geometries (e.g., spherical, ellipsoidal, cuboidal, etc.) of solid adsorbent material. In some examples, the adsorbent can be provided on a higher-order structure, meaning that the adsorbent material may be formed or supported as part of a larger assembly, such as a monolith, honeycomb, or structured composite. This configuration can facilitate improved mechanical strength, enhanced flow distribution, or tailored mass transfer properties within the adsorption column.

The adsorbent can be compositionally homogeneous throughout the cross-section of the adsorbent such that the material has a uniform chemical composition and structure across the entire volume of the adsorbent. This homogeneity can help ensure consistent adsorption properties and predictable performance, supporting reliable carbon dioxide capture and regeneration during repeated cycles. That said, in other cases, the adsorbent may be compositionally heterogeneous such that it includes regions with differing chemical compositions, structures, or properties. This heterogeneity can be used to tailor adsorption characteristics, optimize selectivity, or address specific separation requirements for varying gas stream compositions.

The bed itself can be homogeneous (e.g., substantially similar materials and/or pellet geometries) or heterogeneous (e.g., elements can have mixed sizes, shapes, materials, etc.). Individual adsorbent elements/particulates of an aggregate bed can have a characteristic length (e.g., diameter, pellet length, maximal dimension, etc.) of less than 1 mm, 1 mm, 2 mm, 3 mm, 4 mm, 5 mm, 6 mm, 8 mm, greater than 8 mm, within any suitable open or closed interval bounded by one or more of the aforementioned values, and/or any other suitable characteristic length. In a specific example, elements can be sized with a characteristic length scale (e.g., width, length, diameter, etc.) within a range from 0.1 mm to 5 mm, although other dimensions can be used.

During adsorption, the gas stream generated by gas stream source 10 can be fed at comparatively high pressure into the adsorbent bed. The adsorbent can be selected to preferentially adsorb $CO_2$ molecules onto the surface of the adsorbent. Preferred adsorbents for adsorbing carbon dioxide from wet gas streams according to the disclosure can comprise (or consist essentially of, or consist of) a high silicon, low aluminum Pentasil zeolite. In specific examples, the selected adsorbent or combination of adsorbents may comprise (or consist essentially of, or consist of) silicalite and/or highly dealuminated ZSM-5. These materials can be characterized by very high a silicon-to-aluminum molar ratio, such as a ratio greater than 500:1, or by being substantially aluminum-free. The high silicon-to-aluminum ratio can impart a neutral, hydrophobic framework that reduces competitive uptake of water while maintaining high surface area and accessible microporosity for carbon dioxide adsorption. The low aluminum content can minimize the density of charged sites that otherwise attract polar water molecules, thereby preserving carbon dioxide selectivity in wet gas streams and enabling stable, repeatable performance in cyclic operation.

The selected adsorbent(s) can exhibit a steady-state carbon dioxide adsorption capacity that does not substantially diminish over repeated adsorption-desorption cycling, even across hundreds of thousands to millions of cycles. During each adsorption cycle, the adsorbent selectively adsorbs carbon dioxide and water from the gas stream. In the subsequent desorption cycle, substantially all of the adsorbed carbon dioxide and water are released from the adsorbent, effectively regenerating the material for further use. By minimizing competitive water uptake and inhibiting irreversible loading, the selected adsorbent(s) preserves carbon dioxide capacity throughout extended operation in humid exhaust gas stream environments, supporting efficient and long-lifecycle carbon capture applications.

As used herein, the phrase "carbon dioxide adsorption capacity" refers to the quantitative amount of carbon dioxide that the adsorbent is able to adsorb from the gas stream under the pressure, temperature, and gas composition conditions of operation during steady-state operations. The carbon dioxide adsorption capacity may also be referred to as the steady state equilibrium capacity of the adsorbent. This refers to the amount of carbon dioxide that an adsorbent can consistently adsorb from a gas stream under the operating conditions of the adsorption and desorption cycles after the adsorbent has undergone initial conditioning or break-in. At steady state, the adsorbent has reached a point where the rates of adsorption and desorption are balanced, and the amount of carbon dioxide adsorbed remains substantially constant across repeated cycles. This means the adsorbent reliably returns to substantially the same equilibrium capacity after each adsorption-desorption cycle, indicating stable and repeatable performance over time. During break-in or initial operation, by contrast, the capacity of the adsorbent may change as the material equilibrates, undergoes conditioning, or releases residual species from manufacturing or prior use. The break-in period may be characterized by a gradual increase or decrease in adsorption capacity until the adsorbent reaches its steady state equilibrium capacity, at which point the performance stabilizes and becomes repeatable over subsequent cycles.

During each adsorption cycle, the adsorbent within the adsorption column adsorbs an amount of carbon dioxide and an amount of water from the gas stream. The specific quantities of carbon dioxide and water adsorbed can depend on factors such as the pressure, temperature, gas composition, and the duration of contact between the gas stream and the adsorbent. The amount of carbon dioxide adsorbed during a particular cycle may be less than the carbon dioxide adsorption capacity of the adsorbent, particularly if the adsorption phase is terminated before equilibrium is reached. For example, the amount of carbon dioxide adsorbed during a cycle may range from as little as 5% to as much as 100% of the carbon dioxide adsorption capacity of the adsorbent, such as from 10% to 90%, 20% to 80%, 30% to 100%, or any suitable value within or outside these ranges, depending on the specific process parameters and cycle timing. In various examples, the amount of carbon dioxide adsorbed as a percentage of the carbon dioxide adsorption capacity during each cycle may be at least 10%, at least 20%, at least 30%, at least 40%, at least 50%, at least 60%, at least 70%, at least 80%, at least 90%, or at least 95%.

During each desorption cycle, the adsorbent within the adsorption column releases adsorbed species, including adsorbed carbon dioxide and water. The selected adsorbent can release substantially all, or all, of the adsorbed amount of carbon dioxide and substantially all, or all, of the adsorbed amount of water from the adsorbent. This may be achieved by reducing the pressure within the adsorption column, increasing the temperature, and/or introducing a purge gas to facilitate desorption.

As used herein, the phrase "substantially all" when referring to the release of carbon dioxide and water during each desorption cycle means that the amount of carbon dioxide or water, respectively, retained on the adsorbent, if any, following desorption is sufficiently low such that the carbon dioxide adsorption capacity of the adsorbent decreases by less than 5%, such as less than 2%, or less than 1% over its entire service life encompassing multiple cycles of adsorption and desorption. The release of substantially all adsorbed species ensures effective regeneration of the adsorbent and maintains stable and repeatable performance during extended operation.

Because of the exceptional ability of the adsorbent to release substantially all adsorbed carbon dioxide and water during each desorption cycle, the carbon dioxide adsorption capacity of the adsorbent that does not substantially decrease between each of the plurality of adsorption and desorption cycles or between all the adsorption and desorption cycles. Specifically, the carbon dioxide adsorption capacity of the adsorbent decreases by less than 5%, such as less than 2%, or less than 1% over its entire service life encompassing multiple cycles of adsorption and desorption.

The capability of the adsorbent to exhibit a carbon dioxide adsorption capacity that does not substantially decrease between each of the plurality of adsorption and desorption cycles refers to the performance of the adsorbent across typical cycle-to-cycle operation, in which the adsorbent is regenerated during each desorption step without undergoing a deep regeneration processing in between cycles. Deep regeneration actions refer to special processing steps outside of a standard or repeating desorption cycle and may include prolonged high-temperature treatments, chemical washing, or extended vacuum purging designed to remove strongly bound or irreversibly adsorbed species from the adsorbent. Unlike such deep regeneration methods, the described adsorbent can maintain equilibrium capacity and performance through standard pressure, temperature, and/or concentration swing desorption steps cycle-to-cycle, without requiring or utilizing intensive or specialized regeneration procedures. Accordingly, the adsorbent can reliably return to equilibrium capacity after each standard adsorption-desorption cycle, maintaining consistent performance and selectivity for carbon dioxide over extended periods of operation. The absence of significant capacity loss across cycles demonstrates the robustness of the adsorbent and the suitability of the adsorbent for continuous or repeated use in carbon capture applications.

The adsorbent may undergo a large number of adsorption and desorption cycles during the operational lifetime of the material. A cycle refers to an adsorption step followed by a desorption step, and a plurality of cycles refers to at least two full cycles of adsorption followed by desorption. In commercial practice, the adsorbent is expected to be subjected to many more cycles, such as at least 10 cycles, at least 100 cycles, at least 500 cycles, at least 1,000 cycles, at least 10,000 cycles, at least 100,000 cycles, at least 250,000 cycles, at least 500,000 cycles, at least 1,000,000 cycles, at least 2,000,000 cycles, at least 5,000,000 cycles, or even at least 10,000,000 cycles, depending on the application and system requirements. The ability of the adsorbent to maintain carbon dioxide adsorption capacity over such a wide range of cycles is beneficial for long-term, efficient operation in carbon capture systems.

The mole fraction of the carbon dioxide from the incoming gas stream adsorbed by the adsorbent in adsorption system 14 may be greater than a threshold value, depending on the specific system configuration and operating conditions. For example, the mole fraction of carbon dioxide adsorbed may be greater than 10 mol % of the carbon dioxide present in the incoming gas stream contacting the adsorbent, such as greater than 20 mol %, greater than 30 mol %, greater than 40 mol %, greater than 50 mol %, greater than 60 mol %, greater than 70 mol %, greater than 80 mol %, or even greater than 90 mol % of the carbon dioxide present in the incoming gas stream.

The mole fraction of water from the incoming gas stream adsorbed by the adsorbent in adsorption system 14 may be less than 80 mol % of the water present in the incoming gas stream contacting the adsorbent, such as less than 70 mol %, less than 65 mol %, less than 60 mol %, less than 50 mol %, less than 40 mol %, less than 30 mol %, less than 20 mol %, or less than 10 mol % of the water present in the incoming gas stream.

The purity of the gas stream generated from each desorption cycle can be high, with the desorbed gas stream containing a substantial concentration of carbon dioxide. For example, the desorbed gas stream may contain greater than 80 mol % carbon dioxide on a dry weight basis, greater than 90 mol % carbon dioxide on a dry weight basis, greater than 95 mol % carbon dioxide on a dry weight basis, or even greater than 99 mol % carbon dioxide on a dry weight basis. This elevated purity of the recovered carbon dioxide stream enables efficient downstream utilization, storage, or further processing, and reflects the selectivity and effectiveness of the adsorbent in separating carbon dioxide from mixed gas streams during cyclic operation.

Following each desorption cycle, the gas stream generated—which contains a concentrated amount of carbon dioxide—can be directed to one or more post-adsorption processing units 16 as shown in FIG. 1. These units may be configured to capture the released carbon dioxide and recover the carbon dioxide for storage, utilization, or further processing. For example, the post-adsorption processing units 16 can include equipment for compressing the carbon dioxide into a liquid form, which can then be stored in a tank for subsequent offloading or use in industrial applications.

Example downstream processing steps may be performed depending on the requirements of the application. These steps can include purification to remove trace contaminants, drying to eliminate residual moisture, and pressurization and refrigeration to achieve the desired phase for storage or transport. In some implementations, the recovered carbon dioxide may be further processed to reach supercritical conditions, enabling supercritical carbon dioxide storage. Supercritical carbon dioxide provides benefits in terms of density and transport efficiency, making this form suitable for long-term sequestration or pipeline delivery. By integrating the adsorption system with one or more post-adsorption processing units 16, the overall system supports continuous carbon dioxide capture and management, accommodating a variety of downstream applications and enabling practical deployment in both stationary and mobile carbon capture scenarios.

An example method for separating carbon dioxide from a gas stream containing carbon dioxide and water can include providing an adsorption vessel containing an adsorbent selected from low aluminum pentasil zeolites having a silicon-to-aluminum molar ratio greater than 500:1 or being substantially aluminum-free, and directing the gas stream to contact the adsorbent under conditions effective to cause preferential adsorption of carbon dioxide. The contacting can be performed at an absolute pressure between 1 bar and 5 bar and a temperature between 15° C. and 60° C., although higher pressures up to 30 bar and temperatures up to 100° C. can be used depending on source composition and duty cycle.

During the adsorption step, the adsorbent can selectively load carbon dioxide over various species other than water present in the gas stream. For example, the gas stream may include comprises nitrogen, and contacting the gas stream with the adsorbent can involve preferentially adsorbing carbon dioxide over nitrogen such that a mole ratio of carbon dioxide adsorbed to nitrogen adsorbed is greater than 1 under typical contacting conditions, such as greater than 1.5, greater than 2, or greater than 5. Similarly, the adsorbent can preferentially adsorb carbon dioxide over other species such as oxygen and argon, yielding carbon dioxide-to-oxygen and carbon dioxide-to-argon adsorption mole ratios greater than 1, such as greater than 1.5, greater than 2, or greater than 5. The selective uptake can arise from a hydrophobic, low-charge framework that favors physisorption of carbon dioxide relative to less polarizable species, maintaining high carbon dioxide purity in the desorbed stream across cyclic operation.

Following adsorption, the method can involve desorbing the carbon dioxide to regenerate the adsorbent. Desorption can be effected by reducing the absolute pressure within the adsorption vessel, for example to a pressure less than 1.0 bar, and optionally by increasing temperature and/or lowering the surrounding carbon dioxide partial pressure using a purge gas to drive release of the adsorbed species. In some implementations, adsorption and desorption are controlled by a temperature swing and/or a concentration swing, such as increasing adsorbent temperature or decreasing surrounding carbon dioxide partial pressure to promote desorption, and lowering temperature or increasing carbon dioxide partial pressure to enhance adsorption. The released carbon dioxide can be collected as a desorbed gas stream having a high carbon dioxide purity, for example greater than 90 mol % on a dry weight basis and, in certain cycles, greater than 95 mol % or even greater than 99 mol % on a dry weight basis.

The method can be implemented in a pressure swing adsorption process with at least two adsorption vessels operated out of phase, such that at least one vessel is in the adsorption step while at least one other vessel is in the desorption step. Between steps, a vessel can be isolated by closing inlet and outlet valves to enable switching between pressure setpoints. Pressure within each vessel can be controlled by actuating one or more inlet valves, outlet valves, back-pressure regulators, compressors, or vacuum pumps fluidly coupled to the vessel. The adsorbent can be provided in a variety of sizes and/or shapes, and may be formed with a low-sodium silica binder and activated, for example near 375° C., to improve kinetics and reduce binder-derived ionic sites that could otherwise increase water affinity.

In some examples, the method can be repeatedly performed over thousands to millions of adsorption—desorption cycles without any special or "deep" regeneration of the adsorbent beyond the standard desorption step used in each cycle. That is, the adsorbent can be regenerated by pressure, temperature, and/or concentration swing conditions applied during each desorption step, without resorting to prolonged high-temperature treatments, chemical washing, or extended vacuum purges outside the normal cycle recipe. Even under these standard cycling conditions, the adsorbent can exhibit a carbon dioxide adsorption capacity that does not substantially decrease between each of the plurality of cycles or across the entire lifecycle encompassing all cycles, thereby maintaining steady-state performance and predictable carbon dioxide uptake.

This cycle-to-cycle stability can reflect minimized competitive water uptake and the absence of irreversible loading, such that substantially all adsorbed carbon dioxide and co-adsorbed water are released during each desorption step. As a result, the adsorbent can reliably return to substantially the same equilibrium capacity after each cycle, with capacity loss remaining below typical thresholds (e.g., less than 5%, less than 2%, or even less than 1%) over extended operation.

This approach can enable continuous or semi-continuous carbon dioxide recovery in stationary installations and mobile platforms alike, while avoiding downtime, complexity, and energy penalties associated with special regeneration procedures.

In some implementations, the method can include pretreating the gas stream prior to contacting the adsorbent, for example by particulate filtration, oxidation catalysts for hydrocarbons and carbon monoxide, selective catalytic reduction for nitrogen oxides, desulfurization, and moisture management to control condensation. For biogas upgrading, pretreatment can include bulk moisture knock-out, desiccant or membrane drying, hydrogen sulfide removal, siloxane abatement, and activated carbon polishing.

The method can be configured for stationary or mobile operation. For stationary sources, the adsorption system may include fixed-bed vessels, dedicated vacuum and compression equipment, and downstream liquid carbon dioxide storage tanks. For mobile sources, the adsorption system may be packaged into a vehicle-mounted module comprising compact adsorption vessels; pressure, temperature, and/or concentration swing capability; onboard controls; and storage sized for route-specific offloading intervals. In either configuration, the identified adsorbents can maintain a steady-state carbon dioxide adsorption capacity that does not substantially diminish over repeated adsorption-desorption cycling, even across hundreds of thousands to millions of cycles. By minimizing competitive water uptake and preventing irreversible loading, the adsorbents preserve carbon dioxide selectivity and capacity throughout extended operation in humid exhaust and biogas environments, while the desorbed carbon dioxide stream can be captured and recovered for storage, utilization, or further processing, including compression to liquid for tank storage.

The following example embodiments are within the scope of the application.

Embodiment 1. A method for separating carbon dioxide from a gas stream containing carbon dioxide and water, the method comprising: performing a plurality of adsorption and desorption cycles, wherein each adsorption cycle comprises contacting an adsorbent with the gas stream where the adsorbent has a low aluminum content defined by a silicon-to-aluminum molar ratio greater than 500:1, or being substantially aluminum-free, under conditions effective to cause the adsorbent to adsorb carbon dioxide and water from the gas stream to provide an adsorbed amount of carbon dioxide and an adsorbed amount of water on the adsorbent, and each desorption cycle comprises releasing substantially all of the adsorbed amount of carbon dioxide and substantially all of the adsorbed amount of water from the adsorbent; and wherein the adsorbent exhibits a carbon dioxide adsorption capacity that does not substantially decrease between each of the plurality of adsorption and desorption cycles.

Embodiment 2. The method of Embodiment 1, wherein the adsorbent has a silicon-to-aluminum ratio greater than 600:1, preferably greater than 800:1, and more preferably greater than 1000:1.

Embodiment 3. The method of either of Embodiments 1 or 2, wherein the gas stream comprises an exhaust gas from combustion of a carbon-containing fuel source.

Embodiment 4. The method of either of Embodiments 1 or 2, wherein the gas stream comprises a biogas.

Embodiment 5. The method of any one of Embodiments 1 to 4, wherein the gas stream comprises greater than 1 mol % carbon dioxide on a dry weight basis, preferably greater than 3 mol % carbon dioxide on the dry weight basis, more preferably greater than 5 mol % carbon dioxide on the dry weight basis.

Embodiment 6. The method of Embodiment 5, wherein the plurality of cycles comprises greater than 100,000 cycles, preferably greater than 1,000,000 cycles, more preferably greater than 5,000,000 cycles.

Embodiment 7. The method of any one of Embodiments 1 to 6, wherein the gas stream further comprises nitrogen, and contacting the gas stream with the adsorbent comprises preferentially adsorbing carbon dioxide over nitrogen such that a mole ratio of carbon dioxide adsorbed to nitrogen adsorbed is greater than 1.

Embodiment 8. The method of any one of Embodiments 1 to 7, wherein the adsorbent is substantially aluminum-free.

Embodiment 9. The method of any one of Embodiments 1 to 8, wherein contacting the adsorbent with the gas stream under conditions effective to cause the adsorbent to adsorb carbon dioxide from the gas stream comprises contacting the adsorbent with the gas stream at an absolute pressure within a range from 1 bar to 30 bar and at a temperature less than 100 degrees Celsius.

Embodiment 10. The method of Embodiment 9, wherein the temperature is ambient temperature.

Embodiment 11. The method of either of Embodiments 9 or 10, wherein the range of the absolute pressure is from 1 bar to 5 bar.

Embodiment 12. The method of any one of Embodiments 1 to 11, wherein performing the desorption step to release the adsorbed carbon dioxide and regenerate the adsorbent comprises one or more of reducing a pressure surrounding the adsorbent, changing a temperature of the adsorbent, and/or changing a concentration of a gas surrounding the adsorbent.

Embodiment 13. The method of any one of Embodiments 1 to 12, wherein performing the desorption step to release the adsorbed carbon dioxide and regenerate the adsorbent comprises reducing a pressure surrounding the adsorbent to an absolute pressure less than 1 bar.

Embodiment 14. The method of any one of Embodiments 1 to 13, wherein the contacting is performed in an adsorption vessel containing a bed of the adsorbent.

Embodiment 15. The method of Embodiment 14, further comprising controlling pressure within the adsorption vessel during an adsorption step to maintain an absolute pressure between 1 bar and 30 bar.

Embodiment 16. The method of either of Embodiments 14 or 15, further comprising controlling pressure within the adsorption vessel during the desorption step to an absolute pressure less than 1 bar.

Embodiment 17. The method of any one of Embodiments 14 to 16, wherein controlling the pressure comprises actuating at least one of an inlet valve, an outlet valve, a back-pressure regulator, a compressor, or a vacuum pump fluidly coupled to the adsorption vessel.

Embodiment 18. The method of any one of Embodiments 14 to 17, wherein the adsorption vessel is one of at least two vessels operated out of phase such that at least one vessel is in an adsorption step while at least one other vessel is in a desorption step.

Embodiment 19. The method of any one of Embodiments 14 to 18, further comprising isolating the adsorption vessel between the adsorption step and the desorption step by closing an inlet valve and an outlet valve to switch the vessel between pressure setpoints.

Embodiment 20. The method of any one of Embodiments 1 to 19, wherein the adsorbent is provided in the form of pellets, beads, granules or a higher-order structure having a characteristic dimension between 0.1 mm and 5 mm.

Embodiment 21. The method of any one of Embodiments 1 to 20, wherein the gas stream comprises from 0.75 mole % to 3.5 mole % water vapor and/or a relative humidity of 60% or below, from 3 mole % to 16 mole % carbon dioxide, and from 70 mole % to 90 mole % nitrogen.

Embodiment 22. The method of any one of Embodiments 1 to 21, wherein the gas stream further comprises from 1 mole % to 12 mole % oxygen, from 10 to 10000 ppmv carbon monoxide, from 0 to 1000 ppmv nitrogen oxides, from 0 to 100 ppmv sulfur oxides, from 0 to 5000 ppmv hydrocarbons, and from 0 wt % to 0.5 wt % particulates, from 0 to 15 ppmv non-methane hydrocarbons, and from 0 to 6 ppmv siloxanes.

Embodiment 23. The method of any one of Embodiments 1 to 22, further comprising, prior to contacting the gas stream with the adsorbent, passing the gas stream through an aftertreatment system to at least partially remove nitrogen oxides, carbon monoxide, hydrocarbons, sulfur compounds, and particulate matter.

Embodiment 24. The method of any one of Embodiments 1 to 23, further comprising capturing the released carbon dioxide during the desorption step and recovering the carbon dioxide for storage, utilization, or further processing.

Embodiment 25. The method of Embodiment 24, wherein recovering the carbon dioxide comprises compressing the carbon dioxide into a liquid and storing in a tank.

Embodiment 26. The method of any one of Embodiments 1 to 25, wherein the method is performed in a mobile carbon capture system mounted on a vehicle selected from the group consisting of an on-road vehicle, an off-road vehicle, a train, a ship, or an airplane.

Embodiment 27. The method of any one of Embodiments 1 to 25, wherein the method is performed in a stationary carbon capture system associated with a stationary gas stream source.

Embodiment 28. The method of any one of Embodiments 1 to 27, wherein a mole fraction of carbon dioxide adsorbed by the adsorbent is greater than 30 mol % of the carbon dioxide present in the gas stream.

Embodiment 29. The method of Embodiment 28, wherein a mole fraction of water adsorbed by the adsorbent is less than 65 mole % of the water present in the gas stream.

Embodiment 30. The method of any one of Embodiments 1 to 29, wherein the adsorbent is compositionally homogeneous throughout the cross-section of the adsorbent.

Embodiment 31. The method of any one of Embodiments 1 to 30, further comprising contacting one or more additional adsorbents having a different composition than the adsorbent having the low aluminum content with the gas stream, wherein contacting the one or more additional adsorbents with the gas stream comprises contacting the one or more additional adsorbents with the gas stream in a same bed or in a different bed as the adsorbent having the low aluminum content.

Embodiment 32. The method of any one of Embodiments 1 to 31, wherein each desorption cycle produces a desorbed gas stream having greater than 90 mol % carbon dioxide on a dry weight basis, preferably greater than 95 mol % carbon dioxide on a dry weight basis, more preferably greater than 99 mol % carbon dioxide on a dry weight basis.

Embodiment 33. A method for separating carbon dioxide from a gas stream containing carbon dioxide and water, the method comprising: performing a plurality of adsorption and desorption cycles, wherein each adsorption cycle comprises contacting an adsorbent with the gas stream where the adsorbent is a low aluminum pentasil zeolite having a silicon-to-aluminum molar ratio greater than 500:1, or being substantially aluminum-free, under conditions effective to cause the adsorbent to adsorb carbon dioxide and water from the gas stream to provide an adsorbed amount of carbon dioxide and an adsorbed amount of water on the adsorbent, and each desorption cycle comprises releasing substantially all of the adsorbed amount of carbon dioxide and substantially all of the adsorbed amount of water from the adsorbent; and wherein the adsorbent exhibits a carbon dioxide adsorption capacity that does not substantially decrease between each of the plurality of adsorption and desorption cycles.

Embodiment 34. The method of Embodiment 33, wherein the low aluminum pentasil zeolite is silicalite that is substantially aluminum-free.

Embodiment 35. The method of Embodiment 33, wherein the low aluminum pentasil zeolite is ZSM-5 having the silicon-to-aluminum molar ratio greater than 500:1, preferably greater than 600:1, more preferably greater than 800:1, and even more preferably greater than 1000:1.

Embodiment 36. The method of any one of Embodiments 33 to 35, wherein the gas stream comprises greater than 1 mol % carbon dioxide on a dry weight basis, preferably greater than 3 mol % carbon dioxide on a dry weight basis, more preferably greater than 5 mol % carbon dioxide on a dry weight basis.

Embodiment 37. The method of any one of Embodiments 33 to 36, wherein the gas stream comprises a combustion exhaust gas stream.

Embodiment 38. The method of any one of Embodiments 33 to 36, wherein the gas stream comprises a biogas stream.

Embodiment 39. The method of any one of Embodiments 33 to 38, wherein contacting the adsorbent with the gas stream comprises contacting at an absolute pressure within a range from 1 bar to 30 bar and at a temperature less than 100° C.

Embodiment 40. The method of Embodiment 39, wherein the temperature is ambient temperature and the absolute pressure is within a range from 1 bar to 5 bar.

Embodiment 41. The method of any one of Embodiments 33 to 40, wherein desorbing the adsorbed carbon dioxide comprises reducing a pressure surrounding the adsorbent to an absolute pressure less than 1 bar.

Embodiment 42. The method of any one of Embodiments 33 to 41, wherein the gas stream comprises from 0.75 mole % to 3.5 mole % water vapor and/or a relative humidity of 60% or below, from 3 mole % to 16 mole % carbon dioxide, and from 70 mole % to 90 mole % nitrogen.

Embodiment 43. The method of Embodiment 42, wherein the gas stream further comprises oxygen in an amount ranging from 1 mol % to 12 mol %, carbon monoxide from 10 ppmv to 10,000 ppmv, nitrogen oxides from 0 ppmv to 1,000 ppmv, sulfur oxides from 0 ppmv to 100 ppmv, hydrocarbons from 0 ppmv to 5,000 ppmv, particulates from 0 wt % to 0.5 wt %, non-methane hydrocarbons from 0 ppmv to 15 ppmv, and siloxanes from 0 ppmv to 6 ppmv.

Embodiment 44. The method of any one of Embodiments 33 to 43, further comprising, prior to contacting the gas stream with the adsorbent, passing the gas stream through an aftertreatment system to at least partially remove nitrogen oxides, carbon monoxide, hydrocarbons, sulfur compounds, and particulate matter.

Embodiment 45. The method of any one of Embodiments 33 to 44, wherein each desorption cycle produces a desorbed gas stream having greater than 90 mol % carbon dioxide on a dry weight basis, preferably greater than 95 mol % carbon dioxide on a dry weight basis, and more preferably greater than 99 mol % carbon dioxide on a dry weight basis.

Embodiment 46. The method of any one of Embodiments 33 to 45, wherein the plurality of cycles comprises greater than 100,000 cycles, preferably greater than 1,000,000 cycles, more preferably greater than 5,000,000 cycles.

Embodiment 47. The method of any one of Embodiments 33 to 46, wherein the adsorption system comprises at least two adsorption vessels operated out of phase such that at least one vessel is in an adsorption step while at least one other vessel is in a desorption step.

Embodiment 48. The method of any one of Embodiments 33 to 47, further comprising capturing the released carbon dioxide during the desorption step and recovering the carbon dioxide for storage, utilization, or further processing.

Embodiment 49. The method of any one of Embodiments 33 to 48, wherein the gas stream further comprises nitrogen, and contacting the gas stream with the adsorbent comprises preferentially adsorbing carbon dioxide over nitrogen such that a mole ratio of carbon dioxide adsorbed to nitrogen adsorbed is greater than 1.

Embodiment 50. A method for separating carbon dioxide from a gas stream containing carbon dioxide and water, the method comprising: contacting an adsorbent with the gas stream where the adsorbent has a low aluminum content defined by a silicon-to-aluminum molar ratio greater than 500:1, or being substantially aluminum-free, under conditions effective to cause the adsorbent to adsorb carbon dioxide from the gas stream; and subsequently performing a desorption step to release the adsorbed carbon dioxide and regenerate the adsorbent.

Embodiment 51. The method of Embodiment 50, wherein the adsorbent consists essentially of silicalite.

Embodiment 52. The method of Embodiment 50, wherein the adsorbent consists essentially of ZSM-5 having the silicon-to-aluminum molar ratio greater than 500:1, preferably greater than 600:1, more preferably greater than 800:1, and even more preferably greater than 1000:1.

Embodiment 53. The method of any one of Embodiments 50 to 52, wherein contacting the adsorbent with the gas stream comprises contacting at an absolute pressure within a range from 1 bar to 30 bar and at a temperature less than 100° C.

Embodiment 54. The method of Embodiment 53, wherein the absolute pressure is within a range from 1 bar to 5 bar and the temperature is ambient temperature.

Embodiment 55. The method of any one of Embodiments 50 to 54, wherein the gas stream comprises greater than 1 mol % carbon dioxide on a dry weight basis, preferably greater than 3 mol % carbon dioxide on the dry weight basis, more preferably greater than 5 mol % carbon dioxide on the dry weight basis.

Embodiment 56. The method of any one of Embodiments 50 to 55, wherein the gas stream comprises from 0.75 mole % to 3.5 mole % water vapor and/or a relative humidity of 60% or below, from 3 mole % to 16 mole % carbon dioxide, and from 70 mole % to 90 mole % nitrogen.

Embodiment 57. The method of any one of Embodiments 50 to 56, wherein subsequently performing the desorption step to release the adsorbed carbon dioxide and regenerate the adsorbent comprises reducing the pressure to an absolute pressure less than 1 bar.

Embodiment 58. The method of any one of Embodiments 50 to 57, wherein: a mole fraction of carbon dioxide adsorbed by the adsorbent is greater than 30 mol % of the carbon dioxide present in the gas stream; and a mole fraction of water adsorbed by the adsorbent is less than 65 mole % of the water present in the gas stream.

The following examples may provide additional details about adsorbents, systems, and techniques according to the disclosure.

EXAMPLES

Example 1—Cyclic Steady State and Thermal Activity

Figure 3:
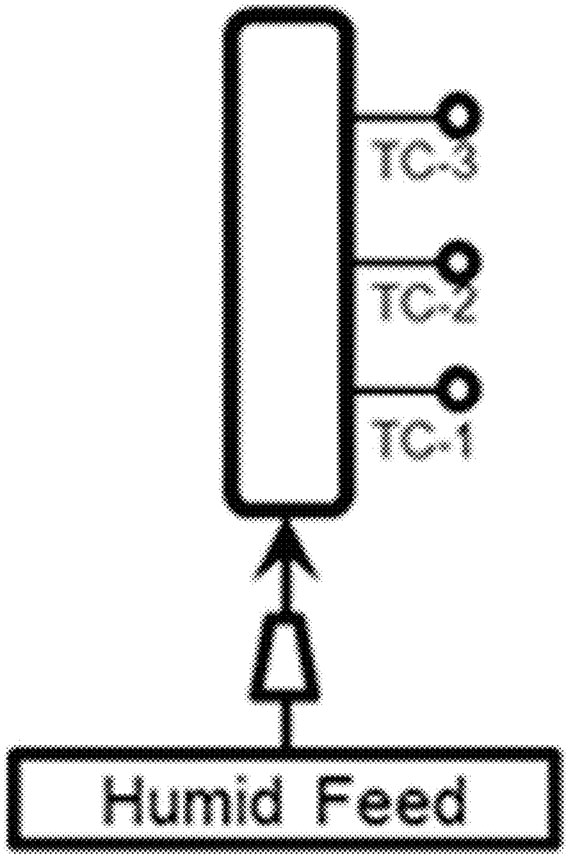
FIG. 3 is a schematic diagram illustrating an example adsorption column showing an example arrangement of temperature sensors according to an experimental apparatus used during testing.

Adsorbent pellets were packed within an adsorption column, and the column was operated in a cyclic manner comprising alternating adsorption and desorption steps. During the adsorption step, a humid gas stream was introduced into the column at an elevated pressure and temperature. A plurality of temperature sensors were arranged at different axial positions within the adsorbent bed and configured to monitor the temperature of the bed during operation. FIG. 3 is a schematic diagram illustrating an example adsorption column showing an example arrangement of three temperature sensors according to the experimental apparatus.

When the humid gas stream contacted the adsorbent during the adsorption step, one or more gas species were adsorbed by the adsorbent, resulting in the release of heat and a corresponding increase in temperature within the bed. Following the adsorption step, a desorption step was performed in which the column was depressurized, for example using a vacuum pump, to remove adsorbed species from the adsorbent. Desorption was associated with a reduction in temperature within the bed as the adsorbed species are released.

Figure 4:
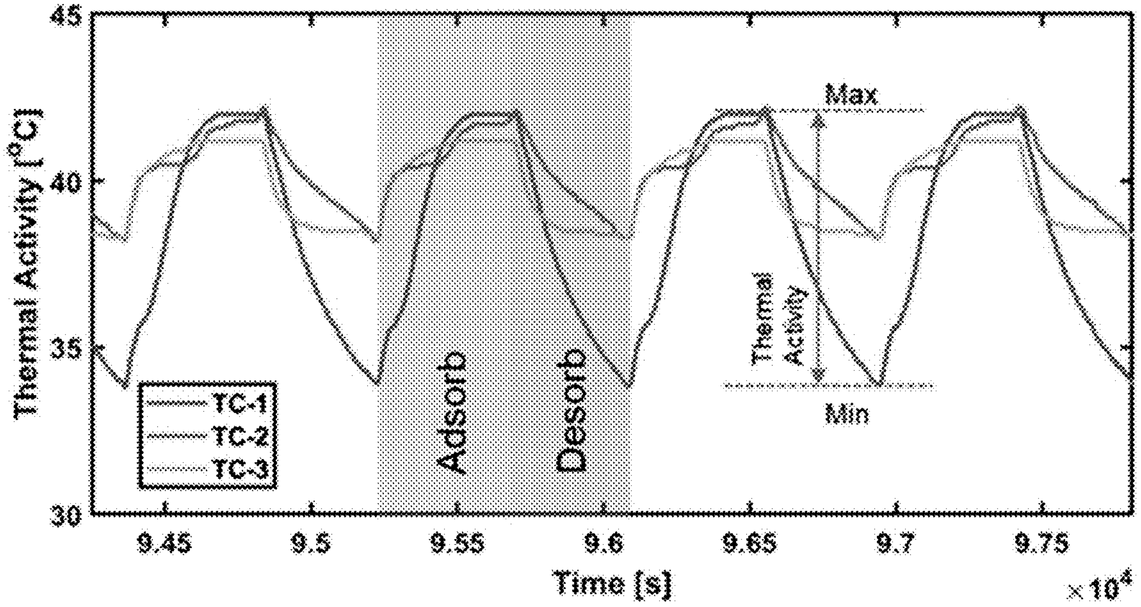
FIGS. 4-8 are plots of experimental data showing adsorbent performance according to aspects of the disclosure along with comparative experimental data.

FIG. 4 illustrates temperature profiles measured by a plurality of thermocouples positioned at different axial locations within an adsorption bed during repeated adsorption and desorption cycles under humid feed conditions. The data show that the temperature increases during adsorption due to exothermic uptake of gas species and decreases during desorption due to endothermic release of adsorbed species. The magnitude of the temperature variation differs axially along the bed, with the largest variation occurring proximately at the feed end.

As shown in FIG. 4, repeated cycling of the adsorption and desorption steps results in a repeatable temperature response at each axial location, indicating operation at cyclic steady state. The temperature variation measured at a temperature sensor located proximate the feed end of the bed (TC-1) is greater than the temperature variation measured at sensors located further downstream (TC-2 and TC-3). This axial variation in temperature response corresponds to a higher degree of adsorption activity occurring near the inlet region of the bed.

The peak-to-peak temperature variation observed at each axial location represents a thermal activity associated with the adsorption and desorption of gas species by the adsorbent. The thermal activity can be used as an indicator of the cyclic adsorption capacity of the adsorbent under the operating conditions. Maintenance of a repeatable thermal activity profile over a plurality of cycles indicates that the adsorbent bed can sustain repeated adsorption and desorption of humid carbon dioxide without substantial degradation in performance.

Comparative Example

Figure 5:
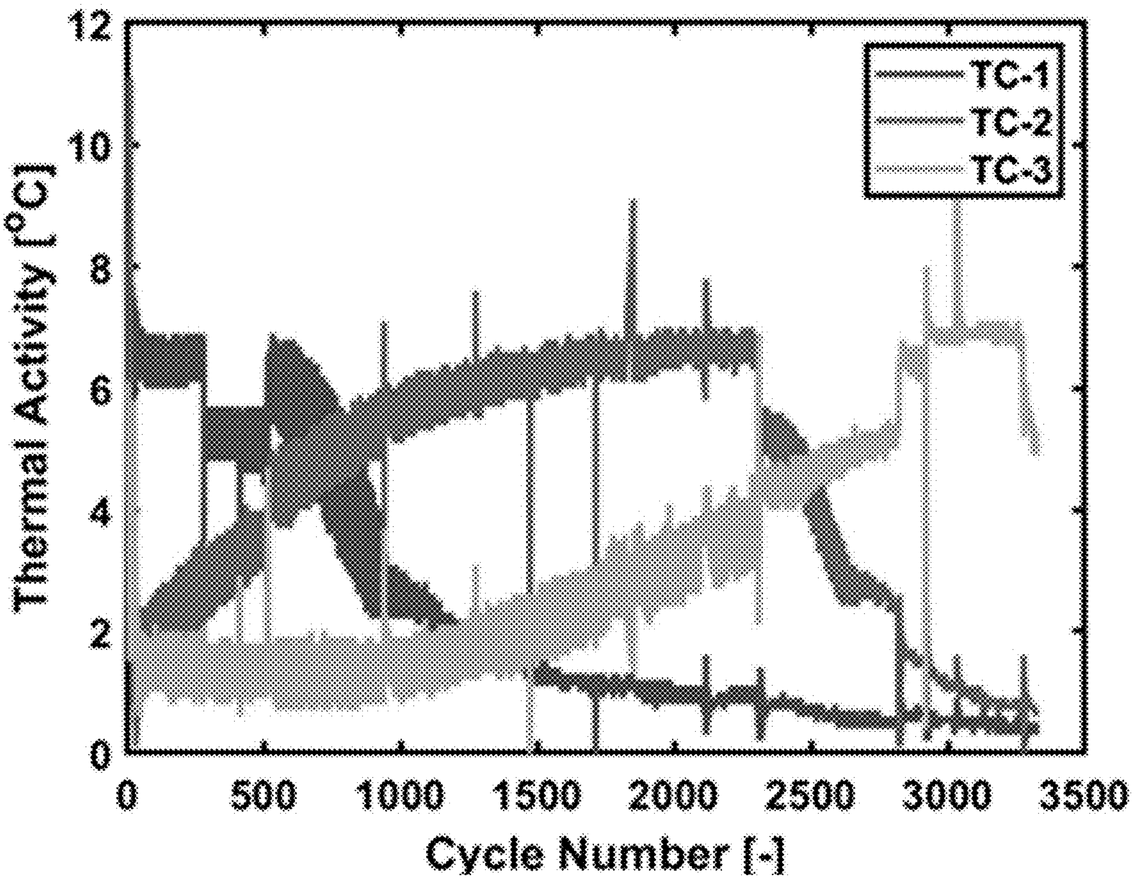

FIG. 5 illustrates the thermal activity measured by a plurality of axially distributed thermocouples within an adsorption bed using zeolite 13X as the adsorbent during a plurality of adsorption and desorption cycles conducted under humid feed conditions. The thermal activity at each thermocouple decreases progressively over successive cycles, indicating a reduction in cyclic adsorption activity over time.

FIG. 5 shows the thermal activity of an adsorption bed formed of zeolite 13X as the adsorbent measured over a large number of adsorption and desorption cycles under humid operating conditions. Thermal activity, defined as the peak-to-peak temperature variation associated with adsorption and desorption at a given axial position, decreases over successive cycles for all thermocouples monitored.

The progressive reduction in thermal activity indicates a corresponding reduction in cyclic adsorption capacity of the bed. This behavior is consistent with strong adsorption of water by zeolite 13X, which contains a relatively high density of charged adsorption sites associated with framework aluminum. Under humid conditions, water is preferentially adsorbed and is not fully released during standard desorption steps, resulting in accumulation of retained water within the bed.

As a consequence, adsorption sites become increasingly unavailable for carbon dioxide adsorption over repeated cycles, leading to degradation of cyclic performance. The declining thermal activity observed across thousands of cycles reflects the inability of the zeolite 13X bed to sustain repeated adsorption and desorption of carbon dioxide in the presence of water without loss of capacity.

Experimental Example

Figure 6:
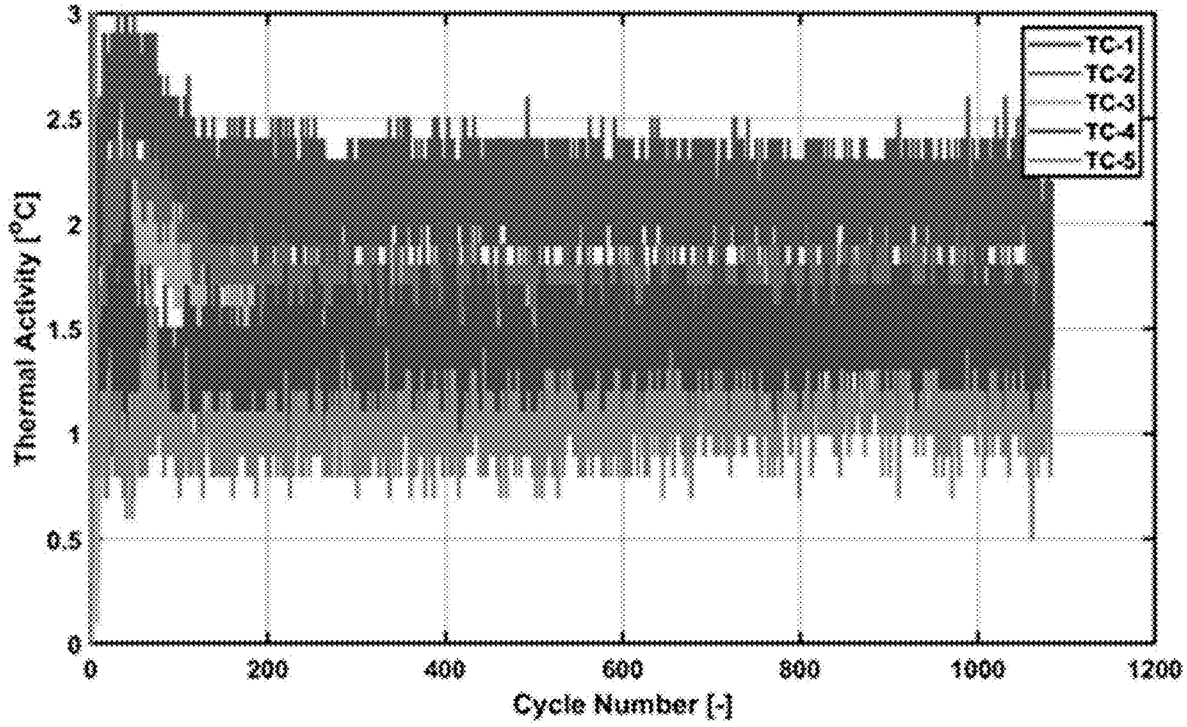

FIG. 6 illustrates the thermal activity measured by a plurality of axially distributed thermocouples within an adsorption bed using a pentasil zeolite having a silicon-to-aluminum molar ratio of approximately 1300:1 as the adsorbent during repeated adsorption and desorption cycles under humid feed conditions. The thermal activity remains substantially constant over the plurality of cycles, indicating stable cyclic adsorption and desorption behavior.

FIG. 6 shows the thermal activity of an adsorption bed formed of a pentasil zeolite having a silicon-to-aluminum molar ratio of approximately 1300:1 as the adsorbent during repeated adsorption and desorption cycles under humid feed conditions. In contrast to the second comparative example discussed above, the thermal activity measured at each axial position remains substantially constant over the plurality of cycles.

The maintained thermal activity indicates that the adsorbent is capable of repeatedly adsorbing and desorbing carbon dioxide under humid conditions without substantial loss of cyclic adsorption capacity. The magnitude of the thermal activity within the mass transfer zone is approximately 2° C., reflecting a moderate but stable and repeatable adsorption front within the bed.

The persistence of thermal activity over extended cycling demonstrates that a significant fraction of the adsorbent's static adsorption capacity—on the order of approximately one-half—is maintained under cyclic operation. This behavior indicates that the low-aluminum pentasil zeolite is capable of releasing substantially all adsorbed water and carbon dioxide during each desorption step, thereby preventing irreversible loading and preserving adsorption sites.

The observed stability contrasts with lower silicon-to-aluminum ratio zeolites and confirms that reducing the aluminum content of the framework reduces competitive water adsorption, enabling sustained cyclic adsorption and desorption of carbon dioxide from humid gas streams.

Humidity-Only Cycling Performance

Figure 7:
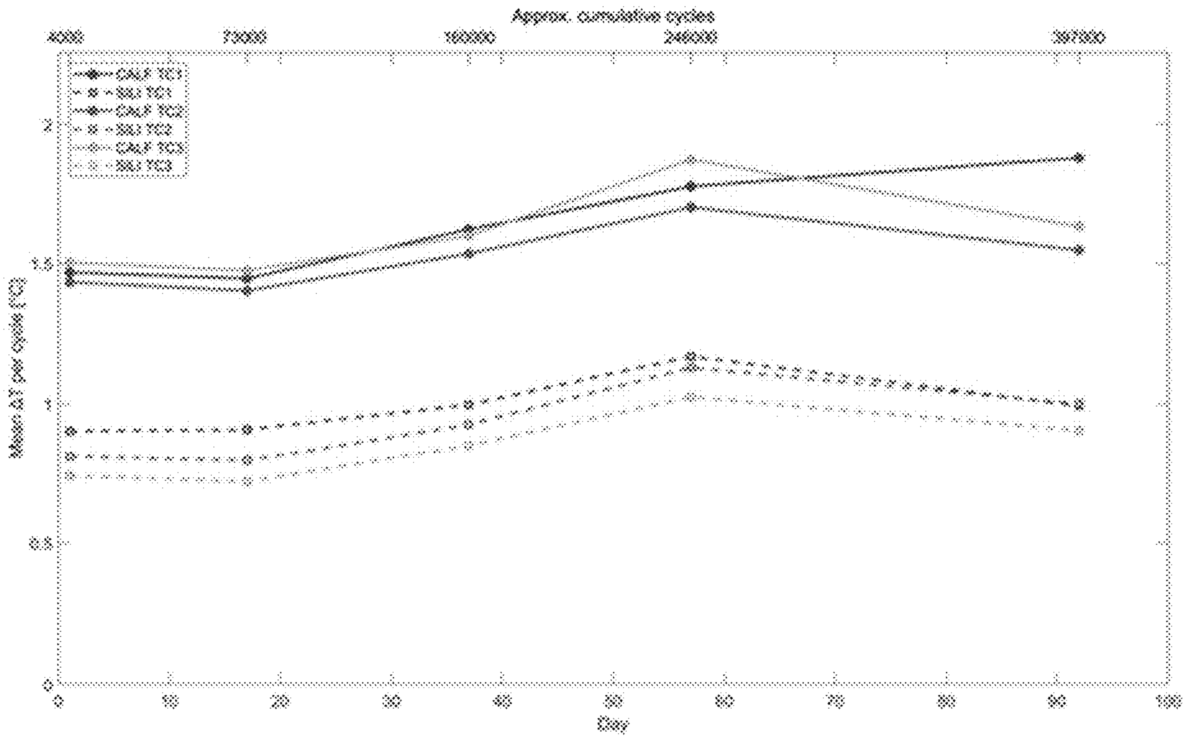

FIG. 7 illustrates the mean thermal activity per cycle measured at multiple axial thermocouple locations within adsorption beds using (i) CALF-20 and (ii) a low-aluminum pentasil zeolite according to the disclosure, respectively, during extended cyclic operation under a humid gas stream. Data are shown as a function of elapsed operating time and corresponding approximate cumulative cycle count extending to approximately 400,000 cycles.

FIG. 7 shows the thermal activity of adsorption beds comprising CALF-20 and a low-aluminum pentasil zeolite during prolonged cyclic adsorption and desorption testing conducted under humid conditions. Thermal activity, defined as the mean peak-to-peak temperature variation per cycle measured by thermocouples positioned at different axial locations within the bed, remains substantially stable for both adsorbents over the duration of the test.

The persistence of thermal activity for both CALF-20 and the low-aluminum pentasil zeolite indicates that each material is capable of sustaining repeated adsorption and desorption cycles in the presence of water vapor without substantial degradation in cyclic adsorption performance. These results demonstrate that both adsorbents exhibit resistance to moisture-induced loss of cyclic adsorption capacity under humidity-only operating conditions extending to approximately 400,000 cycles.

Humid NOx Cycling Performance

Figure 8:
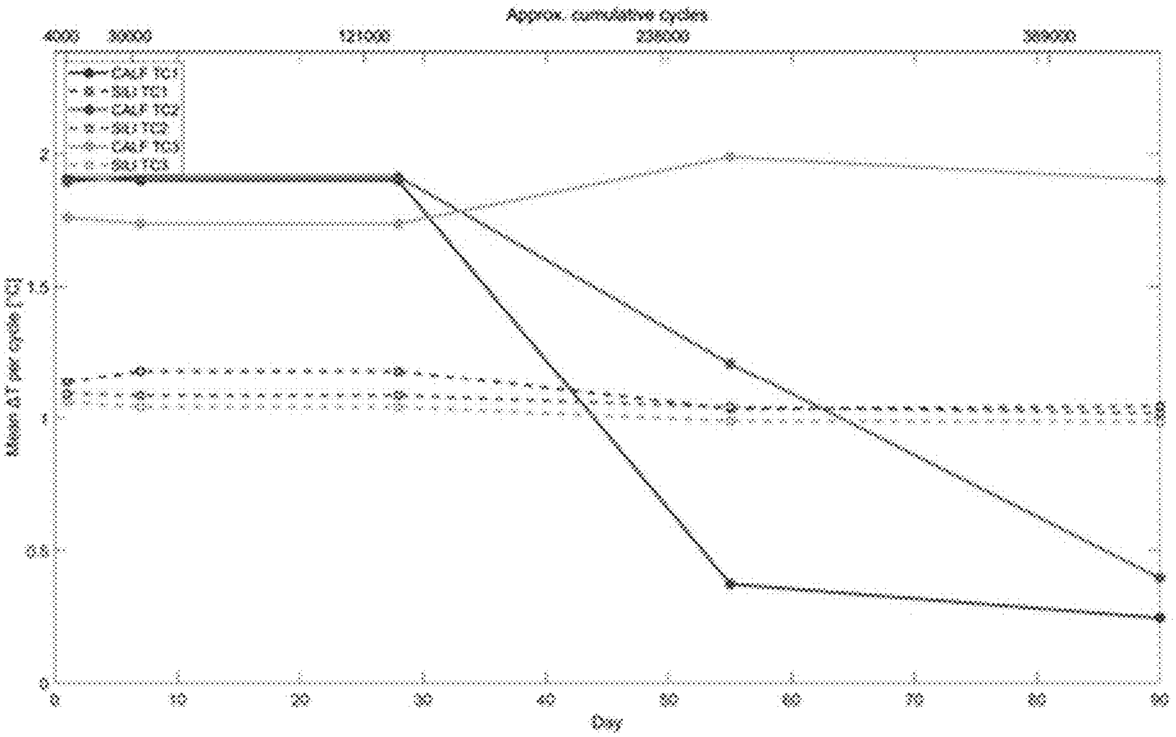

FIG. 8 illustrates the mean thermal activity per cycle measured at multiple axial thermocouple locations within adsorption beds using (i) CALF-20 and (ii) a low-aluminum pentasil zeolite according to the disclosure, respectively, during extended cyclic operation under a humid gas stream containing nitrogen oxides. Data are shown as a function of elapsed operating time and corresponding approximate cumulative cycle count extending to approximately 400,000 cycles.

FIG. 8 shows the thermal activity of adsorption beds comprising CALF-20 and a low-aluminum pentasil zeolite during prolonged cyclic adsorption and desorption testing conducted under humid gas stream conditions containing nitrogen oxides. As shown, the adsorption bed formed of CALF-20 exhibits a marked decrease in mean thermal activity as the number of cycles increases, indicating a reduction in cyclic adsorption and desorption behavior over time.

By contrast, the adsorption bed formed of the low-aluminum pentasil zeolite maintains a substantially constant mean thermal activity across the same number of cycles under humid nitrogen-oxide-containing conditions. The sustained thermal activity indicates that the low-aluminum pentasil zeolite continues to undergo repeated adsorption and desorption without substantial loss of cyclic adsorption capacity, despite prolonged exposure to both water vapor and nitrogen oxides.

The divergent behavior observed in FIG. 8 demonstrates that, while CALF-20 exhibits stability under humidity-only conditions, its cyclic performance degrades in the presence of nitrogen oxides under humid operation. In contrast, the low-aluminum pentasil zeolite resists degradation under both humid nitrogen-oxide-free and humid nitrogen-oxide-containing conditions, indicating enhanced resistance to chemically reactive species and preservation of adsorption functionality over extended cycling.

The maintained thermal activity observed for the low-aluminum pentasil zeolite under both humid nitrogen-oxide-free and humid nitrogen-oxide-containing conditions indicates that the adsorbent is capable of releasing substantially all adsorbed species during each desorption cycle, thereby maintaining a carbon dioxide adsorption capacity that does not substantially decrease over a plurality of cycles. The degradation observed for CALF-20 under humid nitrogen-oxide-containing conditions illustrates the susceptibility of certain adsorbents to performance loss in the presence of reactive gas species, even when moisture stability is otherwise demonstrated.

The invention claimed is:

1. A method for separating carbon dioxide from a gas stream containing carbon dioxide and water, the method comprising:

performing a plurality of adsorption and desorption cycles, wherein each adsorption cycle comprises contacting an adsorbent with the gas stream where the adsorbent has a low aluminum content defined by a silicon-to-aluminum molar ratio greater than 500:1, or being substantially aluminum-free, under conditions effective to cause the adsorbent to adsorb carbon dioxide and water from the gas stream to provide an adsorbed amount of carbon dioxide and an adsorbed amount of water on the adsorbent, and each desorption cycle comprises releasing substantially all of the adsorbed amount of carbon dioxide and substantially all of the adsorbed amount of water from the adsorbent; and wherein the adsorbent exhibits a carbon dioxide adsorption capacity that decreases by less than 5% across the plurality of adsorption and desorption cycles, wherein the plurality of adsorption and desorption cycles comprises at least 100,000 cycles.

2. The method of claim 1, wherein the adsorbent has a silicon-to-aluminum ratio greater than 800:1.

3. The method of claim 1, wherein the gas stream comprises an exhaust gas from combustion of a carbon-containing fuel source.

4. The method of claim 1, wherein the gas stream comprises greater than 3 mol % carbon dioxide on the dry weight basis.

5. The method of claim 1, wherein the plurality of adsorption and desorption cycles comprises greater than 1,000,000 cycles.

6. The method of claim 1, wherein the gas stream further comprises nitrogen, and contacting the gas stream with the adsorbent comprises preferentially adsorbing carbon dioxide over nitrogen such that a mole ratio of carbon dioxide adsorbed to nitrogen adsorbed is greater than 1.

7. The method of claim 1, wherein contacting the adsorbent with the gas stream under conditions effective to cause the adsorbent to adsorb carbon dioxide from the gas stream comprises contacting the adsorbent with the gas stream at an absolute pressure within a range from 1 bar to 30 bar and at a temperature less than 100 degrees Celsius.

8. The method of claim 1, wherein performing each desorption cycle to release the adsorbed carbon dioxide and regenerate the adsorbent comprises one or more of reducing a pressure surrounding the adsorbent, changing a temperature of the adsorbent, and/or changing a concentration of a gas surrounding the adsorbent.

9. The method of claim 1, wherein performing each desorption cycle comprises reducing a pressure surrounding the adsorbent to an absolute pressure less than 1 bar.

10. The method of claim 1, wherein performing the plurality of adsorption and desorption cycles comprises performing the plurality of adsorption and desorption cycles in an adsorption vessel containing a bed of the adsorbent.

11. The method of claim 10, further comprising controlling pressure within the adsorption vessel during each adsorption cycle to maintain an absolute pressure between 1 bar and 30 bar and controlling pressure within the adsorption vessel during each desorption cycle to an absolute pressure less than 1 bar.

12. The method of claim 10, wherein the adsorption vessel is one of at least two vessels operated out of phase such that at least one vessel is in an adsorption cycle while at least one other vessel is in a desorption cycle.

13. The method of claim 1, wherein the gas stream comprises from 0.75 mole % to 3.5 mole % water vapor and/or a relative humidity of 60% or below, from 3 mole % to 16 mole % carbon dioxide, and from 70 mole % to 90 mole % nitrogen.

14. The method of claim 13, wherein the gas stream further comprises from 1 mole % to 12 mole % oxygen, from 10 to 10000 ppmv carbon monoxide, from 0 to 1000 ppmv nitrogen oxides, from 0 to 100 ppmv sulfur oxides, from 0 to 5000 ppmv hydrocarbons, and from 0 wt % to 0.5 wt % particulates, from 0 to 15 ppmv non-methane hydrocarbons, and from 0 to 6 ppmv siloxanes.

15. The method of claim 1, further comprising, prior to contacting the gas stream with the adsorbent, passing the gas stream through an aftertreatment system to at least partially remove nitrogen oxides, carbon monoxide, hydrocarbons, sulfur compounds, and particulate matter.

16. The method of claim 1, further comprising capturing the carbon dioxide released during each of the plurality of desorption cycles and recovering the carbon dioxide for storage, utilization, or further processing.

17. The method of claim 1, wherein the method is performed in a mobile carbon capture system mounted on a vehicle selected from the group consisting of an on-road vehicle, an off-road vehicle, a train, a ship, or an airplane.

18. The method of claim 1, wherein a mole fraction of carbon dioxide adsorbed by the adsorbent is greater than 30 mol % of the carbon dioxide present in the gas stream and a mole fraction of water adsorbed by the adsorbent is less than 65 mole % of the water present in the gas stream.

19. The method of claim 1, wherein the adsorbent is compositionally homogeneous throughout a cross-section of the adsorbent.

20. The method of claim 1, wherein each desorption cycle produces a desorbed gas stream having greater than 90 mol % carbon dioxide on a dry weight basis.

21. A method for separating carbon dioxide from a gas stream containing carbon dioxide and water, the method comprising:

performing a plurality of adsorption and desorption cycles, wherein each adsorption cycle comprises contacting an adsorbent with the gas stream where the adsorbent is a low aluminum pentasil zeolite having a silicon-to-aluminum molar ratio greater than 500:1, or being substantially aluminum-free, under conditions effective to cause the adsorbent to adsorb carbon dioxide and water from the gas stream to provide an adsorbed amount of carbon dioxide and an adsorbed amount of water on the adsorbent, and each desorption cycle comprises releasing substantially all of the adsorbed amount of carbon dioxide and substantially all of the adsorbed amount of water from the adsorbent; and wherein the adsorbent exhibits a carbon dioxide adsorption capacity that decreases by less than 5% across the plurality of adsorption and desorption cycles, wherein the plurality of adsorption and desorption cycles comprises at least 100,000 cycles.

22. The method of claim 21, wherein the low aluminum pentasil zeolite is silicalite that is substantially aluminum-free.

23. The method of claim 21, wherein the low aluminum pentasil zeolite is ZSM-5 having the silicon-to-aluminum molar ratio greater than 600:1.

24. The method of claim 21, wherein the gas stream comprises greater than 3 mol % carbon dioxide on a dry weight basis.

25. The method of claim 21, wherein contacting the adsorbent with the gas stream comprises contacting at an absolute pressure within a range from 1 bar to 30 bar and at a temperature less than 100° C. during each adsorption cycle and releasing the adsorbed carbon dioxide comprises reducing a pressure surrounding the adsorbent to an absolute pressure less than 1 bar during each desorption cycle.

* * * * *